(12) United States Patent
Itoh et al.

(10) Patent No.: US 6,255,400 B1
(45) Date of Patent: Jul. 3, 2001

(54) POLYMER AND APPLICATIONS THEREOF

(75) Inventors: Hiroshi Itoh; Susumu Oyama; Takashi Yodoya; Kenji Tsuboi; Tsugio Matsubara; Kenichi Nakamura; Hirotoshi Doki; Shinya Yamagami; Toshiki Oyanagi; Kenzo Seita, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/197,530

(22) Filed: Nov. 23, 1998

(30) Foreign Application Priority Data

Nov. 28, 1997 (JP) .................................................. 9-328850

(51) Int. Cl.$^7$ .................................................. C08F 267/10
(52) U.S. Cl. ...................... 525/242; 525/296; 525/328.5; 516/135; 162/164.5
(58) Field of Search .................. 162/164.5; 525/296, 525/242, 328.5; 516/135

(56) References Cited

U.S. PATENT DOCUMENTS

| | | | |
|---|---|---|---|
| 3,984,495 | * 10/1976 | Okamura | 525/57 |
| 4,604,428 | * 8/1986 | Fujimatsu et al. | 525/276 |
| 4,748,196 | * 5/1988 | Kuroda et al. | 524/43 |
| 5,239,014 | 8/1993 | Takaki et al. | . |
| 5,290,869 | * 3/1994 | Kinoshita et al. | 525/291 |
| 5,753,759 | * 5/1998 | Hartmann et al. | 525/218 |
| 6,034,208 | * 3/2000 | McDaniel et al. | 528/403 |

* cited by examiner

*Primary Examiner*—Rachel Gorr
(74) *Attorney, Agent, or Firm*—Burns, Doane, Swecker, & Mathis, L.L.P.

(57) ABSTRACT

A polymer (B) is prepared by polymerizing one or more vinyl monomers (c) in the presence of a polymer (A) prepared by polymerizing one or more vinyl monomers (a) selected from the group consisting of vinyl monomers represented by the general formula (1):

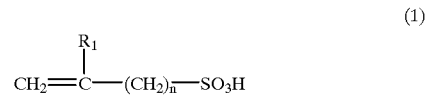

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a).

37 Claims, No Drawings

POLYMER AND APPLICATIONS THEREOF

BACKGROUND OF THE INVENTION

1. Field of the Invention

This invention relates to a polymer, particularly an acrylamide polymer useful for applications such as an additive for paper making.

2. Description of the Related Art

Polymers including acrylamide polymers have been used in a variety of applications; specifically paper strength agents, surface coatings, drainage aids, retention aids, coagulants, water retainers, dispersants, concrete admixtures, enhanced oil recovery agents. In particular, it has been attempted that, for example, when used as a paper strength agent or a surface coating, an acrylamide polymer is combined with a cross-linking agent to have a partially cross-linked and branched structure, by which the polymer has an increased molecular weight while keeping the viscosity of its solution from being increased, for improving the polymer performance.

For example, there has been proposed a technique using a cross-linking compound for increasing molecular weight and lowering viscosity. Specific compounds used include cross-linking vinyl monomers such as difunctional vinyl monomers including methylene bis(meth)acrylamide, ethyleneglycol di(meth)acrylate, diallyl (meth)acrylamide and divinyl adipate; trifunctional monomers including 1,3,5-triacryloylhexahydro-S-triazine; and tetrafunctional monomers including N,N,N',N'-tetraallyl-1,4-diaminobutane, as well as silicone compounds including vinyltriethoxysilane. A molecular-weight increasing technique based on a cross-linking reaction depending only on such a cross-linking compound, has many problems such as higher nonuniformity of a branched and cross-linked structure; in particular, when using a multifunctional vinyl monomer, the solution may become more viscous with the elapse of time. Thus, such a polymer is not satisfactory as a paper strength agent.

Furthermore, it has been attempted that in addition to these cross-linking compounds, a particular compound is combined for providing an acrylamide polymer with a branched and cross-linked structure. Known combinations include those of a cross-linking compound and a primary or a hydroxylated monomer, a cross-linking compound and a particular hydrophobic monomer, and a cross-linking compound and an itaconic acid derivative. It has been implicated that a polymer from any of these combinations may have an increased molecular weight with a lower viscosity. Such polymers are, however, not satisfactory as a paper strength agent in view of their structures. In fact, they have not provided satisfactory results. Besides the previous improvement, a more improved paper strength agent has been desired.

There have been needs for a paper power agent with a more improved performance because paper-making conditions have been increasingly harsh in a paper making process, such as an increase in a wastepaper rate, an increase of pH value in sheet forming, an increase in a rate of a closed white water due to, e.g., effluent regulation, speedup of a paper machine. Overcoming the problem of reduction in a durability of paper is particularly important. Depending on the application, reduction in a Z-axis directional strength as a component of a durability of a paper may be often a significant problem. Paper power agents for improving a Z-axis directional strength have been disclosed. It is known that a cationic acrylamide polymer obtained by Hofmann degradation of an acrylamide polymer is highly effective. However, higher level of Z-axis directional strength is desired.

Meanwhile, many of surface coatings mainly comprise an anionic polymer. Attempts have been previously made, for example, for increasing a molecular weight by incorporating a cross-linked structure and for saving a transportation cost by concentrating of a coating. However, advanced control techniques of polymer structure have not been introduced.

SUMMARY OF THE INVENTION

This invention relates to a polymer, particularly an acrylamide polymer, prepared by a novel polymerization technique. Specifically, it relates to a polymer, particularly an acrylamide polymer, prepared by polymerization in the presence of a polymer having a particular vinyl monomer unit. An objective of this invention is to provide a polymer, particularly an aqueous solution of an acrylamide polymer, with good drainage and paper strength properties and a higher molecular weight but a lower viscosity, as well as a manufacturing process therefor. Another objective of this invention is to provide an additive for paper making such as a paper strength agent, surface coating or drainage aid comprising the above polymer, particularly the above acrylamide polymer.

We have intensively investigated acrylamide polymers in the light of the above circumstances, and have found that a polymer whose structure is well controlled can be provided by means of a novel polymerization technique.

This invention provides the following (1) to (25).

(1) A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

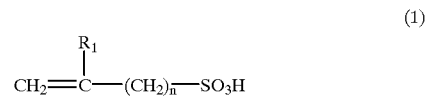

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a);

(2) A polymer (B) according to (1), wherein the weight average molecular weight of the polymer (A) is 1,000 to 5,000,000;

(3) A polymer (B) according to (1), wherein at least one of the vinyl monomers (b) is (meth)acrylamide;

(4) A polymer (B) according to (1), wherein at least one of the vinyl monomers (c) is (meth)acrylamide;

(5) A polymer (B) according to (1), wherein at least one of the vinyl monomers (b) and at least one of the vinyl monomers (c) are (meth)acrylamide;

(6) A polymer (B) according to (1), wherein the polymer (A) consists of the same vinyl monomer components as those of the polymer (B), and at least one vinyl monomer component has a molar ratio in the polymer (A) substantially different from that in the polymer (B);

(7) A polymer (B) according to (1), wherein the remaining vinyl monomer composition after subtracting the vinyl monomer composition of the polymer (A) from that of the polymer (B), is different from the composition of the polymer (A);

(8) A polymer (B) according to (1), wherein the components or the composition are substantially different between the polymers (A) and (B);

(9) A polymer (B) according to (1), wherein at least one of vinyl monomers (b) is an ionic monomer;

(10) A polymer (B) according to (1), wherein at least one of vinyl monomers (b) is an anionic monomer;

(11) A polymer (B) according to (1) having a weight average molecular weight of 100,000 to 10,000,000;

(12) A polymer (B) according to (1) comprising a cross-linking vinyl monomer as a component monomer;

(13) A paper strength agent comprising the polymer (B) according to (1);

(14) A surface coating comprising the polymer (B) according to (1);

(15) A paper strength agent comprising the polymer (B) according to (10);

(16) A surface coating comprising the polymer (B) according to (10);

(17) A process for manufacturing a polymer (B), comprising the steps of
preparing a polymer (A) by polymerizing one or more vinyl monomers (a) selected from the group consisting of vinyl monomers represented by the general formula (1):

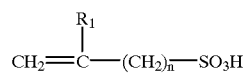

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a); and
polymerizing one or more vinyl monomers (c) in the presence of the polymer (A);

(18) A cationic polymer (C) prepared by Hofmann degradation of the polymer (B) according to (1) wherein one or both of the vinyl monomers (b) and (c) comprise a monomer having an amide group, at an alkaline pH;

(19) A cationic polymer (C) according to (18) wherein the monomer having an amide group is (meth)acrylamide;

(20) A cationic polymer (C) according to (18) wherein the polymer (B) contains 0.1 to 99.9 mol % of the monomers of the polymer (A);

(21) A cationic polymer (C) according to (18) wherein the weight average molecular weight of the polymer (B) is 100,000 to 10,000,000;

(22) A cationic polymer (C) according to (18) wherein said Hofmann degradation is reaction of the polymer (B) with a hypohalous acid salt at an alkaline pH at a temperature of 50 to 110° C.;

(23) A paper strength agent comprising the cationic polymer (C) according to (18);

(24) A drainage aid comprising the cationic polymer (C) according to (18);

(25) A process for manufacturing a cationic polymer (C), comprising the steps of
preparing a polymer (A) by polymerizing one or more vinyl monomers (a) selected from the group consisting of vinyl monomers represented by the general formula (1):

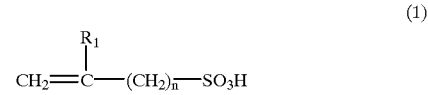

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a);
polymerizing one or more vinyl monomers (c) in the presence of the polymer (A) to prepare a polymer (B); and
conducting Hofmann degradation of the polymer (B) at an alkaline pH;
and wherein one or both of the vinyl monomers (b) and (c) comprise a monomer having an amide group.

The polymer of this invention may be prepared by multi-step polymerization using monomers having particular structures as components. It, therefore, has excellent properties such as freeness property and mechanical strength as well as exhibits good workability with a lower viscosity. Thus, the polymer can be suitably used as an additive for paper making such as a paper strength agent, a surface coating and a drainage aid.

In addition, (meth)acrylamide may be used as a component for the polymer of this invention to provide a polymer with good mechanical strength even under harsh paper-making conditions.

Furthermore, the cationic acrylamide polymer of this invention prepared by Hofmann degradation can improve a Z-axis directional strength and a freeness in particular, even under harsh paper-making conditions such as increase of waste papers.

DETAILED DESCRIPTION OF THE PREFERRED EMBODIMENTS

This invention will be detailed.

The polymer of this invention is a polymer essentially comprising the polymer (A) prepared by polymerizing particular vinyl monomers (a) and vinyl monomers (b). In brief, the polymer (A) is a component of the polymer (B).

Polymer (A)

First, the polymer (A) prepared from one or more vinyl monomers (a) selected from the group consisting of vinyl monomers represented by the general formula (1) and their salts and vinyl monomers (b) co-polymerizable with the components (a) will be described.

Vinyl monomers (a)

One or more vinyl monomers (a) selected from the group consisting of vinyl monomers represented by the general formula (1) and their salts which are used as components of the polymer (A) of this invention are the vinyl monomers represented by the general formula (1) wherein an alkyl represented by $R_1$ is a lower alkyl with 1 to 3 carbon atoms, such as methyl, ethyl, n-propyl and i-propyl. Salts of the vinyl monomers include alkali metal salts such as sodium and potassium salts, and ammonium salts. Sulfonates represented by the general formula (1) include allylsulfonic acid, sodium allylsulfonate, methallylsulfonic acid, sodium methallylsulfonate and ammonium methallylsulfonate.

In the general formula (1), n is an integer of 1 to 8, preferably 1 to 4.

The vinyl monomers represented by the general formula (1) are contained in the polymer (A) in 0.005 to 50 mol %, preferably 1 to 40 mol %. The vinyl monomers may be used alone or in combination thereof.

Vinyl monomers (b)

The vinyl monomers (b) used for preparation of the polymer (A) of this invention, which are co-polymerizable with the vinyl monomers (a) represented by the general formula (1) may be any monomers co-polymerizable with the vinyl monomers (a), and thus selected from a variety of monomers. The vinyl monomers (b) include, preferably in view of polymerizability, (meth)acrylamide, an ionic monomer, (meth)acrylamide and an ionic monomer, and (meth)acrylamide and a hydrophobic monomer. When anionic vinyl monomers are used as the vinyl monomers (b), a paper strength agent and a surface coating of excellent properties can be obtained.

Anionic vinyl monomers include unsaturated carboxylic acids and their salts such as acrylic acid, methacrylic acid, crotonic acid, itaconic acid, maleic acid, fumaric acid, citraconic acid, 3-butene-1,2,3-tricarboxylic acid 4-pentene-1,2,4-tricarboxylic acid and aconitic acid as well as unsaturated sulfonic acids and their salts such as vinylsulfonic acid, styrenesulfonic acid, acrylamide 2-methylpropanesulfonic acid and acrylamide tert-butylsulfonic acid. These may be used alone or in combination of several compounds thereof.

Other monomers used for preparation of the polymer (A)

In polymerization for the polymer (A), other monomers such as (meth)acrylamide, hydrophobic monomers, ionic monomers as well as hydrophilic monomers and cross-linking monomers may be incorporated.

Ionic monomers

Anionic monomers may be those described above.

Cationic monomers include amines such as N,N-dimethylaminoethyl (meth)acrylate, N,N-diethylaminoethyl (meth)acrylate, N,N-dimethylaminopropyl (meth)acrylate, N,N-dimethylaminopropyl (meth)acrylamide and N,N-diethylaminopropyl (meth)acrylamide and their salts, and their quaternary compounds with, for example, methyl chloride, benzyl chloride, dimethyl sulfate and epichlorohydrin and dimethyldiallyl ammonium chloride dimethyldiallyl ammonium bromide, Hydrophobic monomers Hydrophobic monomers include N-alkyl (meth)acrylamides such as N,N-di-n-propyl (meth)acrylamide, N-n-butyl (meth)acrylamide, N-n-hexyl (meth)acrylamide, N-n-octyl (meth)acrylamide, N-tert-octyl (meth)acrylamide, N-dodecyl acrylamide and N-n-dodecyl methacrylamide; N-(ω-glycidoxyalkyl) (meth)acrylamides such as N,N-diglycidyl (meth)acrylamide, N-(4-glycidoxybutyl) (meth)acrylamide, N-(5-glycidoxypentyl) acrylamide and N-(6-glycidoxyhexyl) acrylamide; (meth)acrylates such as methyl (meth)acrylate, ethyl (meth)acrylate, butyl (meth)acrylate, lauryl (meth)acrylate, 2-ethylhexyl (meth)acrylate and glycidyl (meth)acrylate; olefins such as acrylonitrile, methacrylonitrile, vinyl acetate, vinyl chloride, vinylidene chloride, ethylene, propylene and butene; styrene; α-methylstyrene; butadiene; and isoprene.

Hydrophilic monomers

Hydrophilic monomers include, besides (meth) acrylamides, diacetone acrylamide, N,N-dimethyl (meth) acrylamide, N-ethyl (meth)acrylamide, N,N-diethyl (meth) acrylamide, N-propyl acrylamide, N-acryloylpyrrolidine, N-acryloylpiperidine, N-acryloylmorpholine, hydroxyethyl (meth)acrylate, hydroxypropyl (meth)acrylate, a variety of methoxypolyethyleneglycol (meth)acrylates, N-vinylformamide, N-vinylacetamide and N-vinyl-2-pyrrolidone.

Cross-linking monomers

Cross-linking monomers include difunctional cross-linking monomers such as methylene bis(meth)acrylamide, ethylene bis(meth)acrylamide, dimethyl(meth)acrylamide, hexamethylene bis(meth)acrylamide, ethyleneglycol di(meth)acrylate, diethyleneglycol di(meth)acrylate, triethyleneglycol di(meth)acrylate, divinylbenzene and diallyl (meth)acrylamide; and multifunctional cross-linking monomers such as 1,3,5-triacryloylhexahydro-S-triazine, triallyl isocyanurate, pentaerythritol triacrylate, trimethylolpropane acrylate, triacrylformal and diacryloylimide.

Polymerization procedure for the polymer (A)

The polymer (A) in this invention may be preferably prepared by radical polymerization. A polymerization solvent is usually, but not limited to, water. Organic solvents such as alcohols and dimethylformamide may be used, and mixture of water and organic solvents.

Polymerization for the polymer (A) in this invention may be conducted by a batch polymerization process in which all monomers are placed together in a reactor and polymerized; a semi-batch polymerization process in which some or all monomers are added dropwise in a reactor to initiate polymerization; or a continuous polymerization process in which a produced polymer is continuously removed while continuously supplying materials such as monomers.

Initiators which may be used in polymerization for the polymer (A) in this invention, are preferably, but not limited to, water-soluble ones. They may be added in one portion or dropwise into an aqueous solution of monomers.

Specific initiators include persulfates and peroxides such as ammonium persulfate, potassium persulfate, sodium persulfate, hydrogen peroxide, benzoyl peroxide and tert-butyl peroxide. These may be preferably used alone, or may be used as a redox initiator in combination with a reducing agent. Reducing agents which may be used include sulfites, hydrosulfites, lower ionized salts of metals such as iron, copper and cobalt, organic amines such as N,N,N',N'-tetramethylethylenediamine and reducing sugars such as aldoses and ketoses.

In this invention, azo compounds are also preferable, including 2,2'-azobis-2-methylpropionamidine hydrochloride, 2,2'-azobis-2,4-dimethylvaleronitrile, 2,2'-azobis-N,N'-dimethyleneisobutylamidine hydrochloride, 2,2'-azobis-2-methyl-N-(2-hydroxyethyl)-propionamide, 2,2'-azobis-2-(2-imidazolin-2-yl)-propane and its salts, and 4,4'-azobis-4-cyanovaleric acid and its salts. These initiators may be used in combination of two or more.

In polymerization for the polymer (A) in this invention, a polymerization temperature is about 30 to 100° C. for a single initiator and is in a lower region, about 5 to 90° C. for a redox initiator. During polymerization, the system may not be necessarily kept at the same temperature and may be varied as appropriate, as the polymerization proceeds. The temperature of the polymerization system is generally raised due to polymerization heat generated during the polymerization reaction, and therefore it may be necessary to cool the system. The atmosphere of the polymerization reactor may be preferably, but not limited to, replaced with an inert gas such as nitrogen for promoting polymerization.

In polymerization for the polymer (A) in this invention, a polymerization period may be generally, but not limited to, about 5 min to 20 hours including a dropping time in a semi-batch polymerization.

In polymerization for the polymer (A) in this invention, a polymerization pH is not particularly limited, and may be adjusted as needed. Exemplary pH adjusting agents which may be used include alkaline agents such as sodium hydroxide, potassium hydroxide and ammonia; inorganic acids such as phosphoric acid, sulfuric acid and hydrochloric acid; and organic acids such as formic acid and acetic acid.

In polymerization for the polymer (A) in this invention, a polymerization concentration, i.e., a concentration of the polymer (A) at the end of the polymerization, is preferably 1 to 50 wt %, more preferably 5 to 50 wt %.

Physical properties of the polymer (A)

The weight average molecular weight of the polymer (A) is preferably 1,000 to 5,000,000, more preferably 1,000 to 2,000,000, most preferably 1,000 to 1,000,000.

Polymer (B)

The polymer (B) prepared by polymerizing one or more vinyl monomers (c) in the presence of the polymer (A) in this invention, will be described.

Vinyl monomers (c)

The vinyl monomers (c) for the polymer (B) of this invention may be selected from a variety of monomers. Therefore, they may be optionally chosen from various combinations, preferably in view of polymerizability (meth) acrylamide, an ionic monomer, (meth)acrylamide and an ionic monomer, and (meth)acrylamide and a hydrophobic monomer. Other monomers such as (meth)acrylamide, hydrophobic monomers, ionic monomers as well as hydrophilic monomers and cross-linking monomers may be incorporated. In particular, a cross-linking monomer may be incorporated for providing a suitably high molecular weight of polymer. Furthermore, co-polymerization of the vinyl monomers (a) may be preferably used.

Anionic vinyl monomers include unsaturated carboxylic acids and their salts such as acrylic acid, methacrylic acid, crotonic acid, itaconic acid, maleic acid, fumaric acid, citraconic acid, 3-butene-1,2,3-tricarboxylic acid 4-pentene-1,2,4-tricarboxylic acid and aconitic acid as well as unsaturated sulfonic acids and their salts such as vinylsulfonic acid, styrenesulfonic acid, acrylamide 2-methylsulfonic acid and acrylamide tert-butylsulfonic acid. These may be used alone or in combination of several compounds thereof.

Cationic monomers include amines such as N,N-dimethylaminoethyl (meth)acrylate, N,N-diethylaminoethyl (meth)acrylate, N,N-dimethylaminopropyl (meth)acrylate, N,N-dimethylaminopropyl (meth)acrylamide and N,N-diethylaminopropyl (meth)acrylamide and their salts, and their quaternary compounds with, for example, methyl chloride, benzyl chloride, dimethyl sulfate and epichlorohydrin and dimethyldiallyl ammonium chloride dimethyl-diallyl ammonium bromide, such as methacryloyloxyethyl-dimethyl-benzylammonium chloride(DMBq), methacryloyloxyethyl-dimethyl-benzylammonium bromide.

Hydrophobic monomers include N-alkyl (meth) acrylamides such as N,N-di-n-propyl (meth)acrylamide, N-n-butyl (meth)acrylamide, N-n-hexyl (meth)acrylamide, N-n-octyl (meth)acrylamide, N-tert-octyl (meth)acrylamide, N-dodecyl acrylamide and N-n-dodecyl methacrylamide; N-(ω-glycidoxyalkyl) (meth)acrylamides such as N,N-diglycidyl (meth)acrylamide, N-(4-glycidoxybutyl) (meth) acrylamide, N-(5-glycidoxypentyl) acrylamide and N-(6-glycidoxyhexyl) acrylamide; (meth)acrylates such as methyl (meth)acrylate, ethyl (meth)acrylate, butyl (meth)acrylate, lauryl (meth)acrylate, 2-ethylhexyl (meth)acrylate and glycidyl (meth)acrylate; olefins such as acrylonitrile, methacrylonitrile, vinyl acetate, vinyl chloride, vinylidene chloride, ethylene, propylene and butene; styrene; α-methylstyrene; butadiene; and isoprene.

Hydrophilic monomers include diacetone acrylamide, N,N-dimethyl (meth)acrylamide, N-ethyl (meth)acrylamide, N,N-diethyl (meth)acrylamide, N-propyl acrylamide, N-acryloylpyrrolidine, N-acryloylpiperidine, N-acryloylmorpholine, hydroxyethyl (meth)acrylate, hydroxypropyl (meth)acrylate, a variety of methoxypolyethyleneglycol (meth)acrylates, N-vinylformamide, N-vinylacetamide and N-vinyl-2-pyrrolidone.

Cross-linking monomers include difunctional cross-linking monomers such as methylene bis(meth)acrylamide, ethylene bis(meth)acrylamide, dimethylmethacrylamide, hexamethylene bis(meth)acrylamide, ethyleneglycol di(meth)acrylate, diethyleneglycol di(meth)acrylate, triethyleneglycol di(meth)acrylate, divinylbenzene and diallyl (meth)acrylamide; and multifunctional cross-linking monomers such as 1,3,5-triacryloylhexahydro-S-triazine, triallyl isocyanurate, pentaerythritol triacrylate, trimethylolpropane acrylate, triacrylformal and diacryloylimide.

When anionic vinyl monomers (b) are used, in the polymer (B) of this invention, the anionic vinyl monomers (b) are contained in preferably 0.1 to 50 mol %, more preferably 1 to 30 mol %. The anionic vinyl monomers (b) may be used not only as monomer components for the polymer (A) but also the vinyl monomers (c) in polymerization for the polymer (B).

Preparation process for the polymer (B)

In polymerization for the polymer (B) of this invention, the polymer (A) may be used as a powder or liquid. It may be preferable that the polymer (B) is prepared by (i) preparing the polymer (A) using a known polymerization process, quenching the reaction and then forming the polymer (B) or (ii) preparing the polymer (A) and then continuously forming the polymer (B).

The polymer (B) in this invention may be preferably prepared by radical polymerization. A polymerization solvent is usually, but not limited to, water. Organic solvents such as alcohols and dimethylformamide may be used. For Hofmann degradation, since the reaction system is usually an aqueous solution, it is preferable to use water as a polymerization solvent.

Polymerization for the polymer (B) in this invention may be conducted by a batch polymerization process in which all monomers are placed together in a reactor and polymerized, or a semi-batch polymerization process in which the polymer (A) and some or all monomers are added dropwise in a reactor to initiate polymerization. Alternatively, a semi-batch polymerization in which a solution of the polymer (A) is first placed in a reactor, and some or all monomers are then dropped to initiate polymerization may be used. Furthermore, polymerization for the polymer (B) may be conducted intermittently with several steps.

Initiators which may be used in polymerization for the polymer (B) in this invention, are preferably, but not limited to, water-soluble ones. They may be added in one portion or dropwise into an aqueous solution of monomers. Specific initiators include persulfates and peroxides such as ammonium persulfate, potassium persulfate, sodium persulfate, hydrogen peroxide, benzoyl peroxide and tert-butyl peroxide. These may be preferably used alone, or may be used as a redox initiator in combination with a reducing agent. Reducing agents which may be used include sulfites, hydrosulfites, lower ionized salts of metals such as iron, copper and cobalt, organic amines such as N,N,N',N'-tetramethylethylenediamine and reducing sugars such as aldoses and ketoses.

In this invention, azo compounds are also preferable, including 2,2'-azobis-2-methylpropionamidine hydrochloride, 2,2'-azobis-2,4-dimethylvaleronitrile, 2,2'-azobis-N,N'-dimethyleneisobutylamidine hydrochloride, 2,2'-azobis-2-methyl-N-(2-hydroxyethyl)-propionamide, 2,2'-azobis-2-(2-imidazolin-2-yl)-propane and its salts, and 4,4'-azobis-4-cyanovaleric acid and its salts. These initiators may be used in combination of two or more.

In polymerization for the polymer (B) in this invention, a polymerization temperature is about 30 to 100° C. for a single initiator and is in a lower region, about 5 to 90° C. for a redox initiator. During polymerization, the system may not be necessarily kept at the same temperature and may be varied as appropriate, as the polymerization proceeds. The temperature of the polymerization system is generally raised due to polymerization heat generated during the polymerization reaction, and therefore it may be necessary to cool the system. The atmosphere of the polymerization reactor may be preferably, but not limited to, replaced with an inert gas such as nitrogen for promoting polymerization.

In polymerization for the polymer (B) in this invention, a polymerization period may be generally, but not limited to, about 5 min to 20 hours including a dropping time in a semi-batch polymerization.

In polymerization for the polymer (B) in this invention, a polymerization pH is not particularly limited, and may be adjusted as needed. Exemplary pH adjusting agents which may be used include alkaline agents such as sodium hydroxide, potassium hydroxide and ammonia; inorganic acids such as phosphoric acid, sulfuric acid and hydrochloric acid; and organic acids such as formic acid and acetic acid.

In polymerization for the polymer (B) in this invention, a polymerization concentration, i.e., a concentration of the polymer (B) at the end of the polymerization, is preferably 1 to 70 wt %, more preferably 5 to 50 wt %.

In preparation of the polymer (B) of this invention, a cross-linking monomer may be used as an essential component, to provide a polymer which may be expected to exhibit an improved paper strengthening effect. Cross-linking monomers include difunctional cross-linking monomers such as methylene bis(meth)acrylamide, ethylene bis(meth)acrylamide, dimethyl(meth)acrylamide, hexamethylene bis(meth)acrylamide, ethyleneglycol di(meth)acrylate, diethyleneglycol di(meth)acrylate, triethyleneglycol di(meth)acrylate, divinylbenzene and diallyl (meth)acrylamide; and multifunctional cross-linking monomers such as 1,3,5-triacryloylhexahydro-S-triazine, triallyl isocyanurate, pentaerythritol triacrylate, trimethylolpropane acrylate, triacrylformal and diacryloylimide.

These cross-linking vinyl monomers may be preferably used in the amount of 0.01 to 5 mol %, more preferably, 0.01 to 2 mol % to the total amount of the monomers for preparing the polymer (B).

These cross-linking vinyl monomers may be used during preparation of the polymer (A) or both of the polymer (A) and the polymer (B), preferably preparation of the polymer (B).

The molar ratio of all the monomers for the polymer (A) to all the monomers for the polymer (B) of this invention [(A)/(B)] is preferably 0.001 to 0.999, more preferably 0.01 to 0.98, still more preferably 0.02 to 0.40 or 0.45 to 0.99, most preferably 0.04 to 0.30 or 0.60 to 0.98.

The molar ratio of (meth)acrylamide to all the monomers for the polymer (B) [(meth)acrylamide/(B)] is preferably 0.001 to 0.999, more preferably 0.04 to 0.96.

When the polymer (B) is intended to use as an additive for papermaking which also has a paper strengthening effect, the molar ratio of (meth)acrylamide for the polymer (B) to all the monomers for the polymer (B) is preferably 0.50 to 0.999, and the molar ratio of all the ionic monomers to all the monomers for the polymer (B) is preferably 0.005 to 0.50, more preferably 0.01 to 0.30.

In this invention, the combination and the composition of the vinyl monomers (a) and (b) for the polymer (A) may not be necessarily the same as those of the vinyl monomers (c), and may be varied depending on an application of the resulting polymer. For example, the vinyl monomers (b) and the vinyl monomers (c) may be as follows:

| NO. | vinyl monomers (b) | vinyl monomers (c) |
|-----|--------------------|--------------------|
| (1) | cationic monomers | noncationic monomers (nonionic or anionic monomers etc.) |
| (2) | anionic monomers | nonanionic monomers (nonionic or cationic monomers etc.) |
| (3) | nonanionic monomers (nonionic or cationic monomers etc.) | anionic monomers |
| (4) | noncationic monomers (nonionic or anionic monomers etc.) | cationic monomers |
| (5) | nonhydrophobic monomers | hydrophobic monomers |
| (6) | hydrophobic monomers | nonhydrophobic monomers |

Paper strength agent or surface coating in which anionic monomer(s) are used for vinyl monomers (b) shows excellent properties and paper strength agent in which cationic monomer(s) are used for vinyl monomers (b) and anionic monomer(s) are used for vinyl monomers (c) shows excellent properties.

The vinyl monomers [the vinyl monomers (a) and (b)] for the polymer (A) and the vinyl monomers (c) may be the same in their monomer combinations and different from their compositions.

For example, acrylic acid and acrylonitrile may be used as an anionic vinyl compound (b) in preparation of the polymer (A) and a vinyl compound (c) co-polymerizable with (meth) acrylamide in preparation of the polymer (B), respectively. Alternatively, acrylic acid may be used for (b) and (c), with different ratios. The molar ratio of (meth)acrylamide in the polymer (B) is preferably at least 50 mol %.

The weight average molecular weight of the polymer (B) is preferably 100,000 to 10,000,000, more preferably 500,000 to 10,000,000 when applied for paper strength agent or surface coating.

For the polymer (A), the weight average molecular weight is preferably 1,000 to 5,000,000. A compound represented by the general formula (a) may be used for controlling the molecular weight of the polymer (B). Furthermore, a known chain transfer agent may be used or polymerization conditions including a temperature and a polymerization period may be adjusted, for controlling the molecular weight of the polymer B as appropriate.

A cross-linking agent may be used for increasing the molecular weight with a lower viscosity. It may be achieved by incorporating a monomer such as N-substituted (meth) acrylamides which may be grafted, or by conducting polymerization at a higher temperature, i.e., 90° C. or higher, to provide a relatively loose cross linking.

The acrylamide polymer of this invention may be used as a paper strength agent etc. after being subject to modification such as Mannich modification and Hofmann modification. It may be used in combination with or as a mixture with a variety of ionic polymers.

Paper strength agent and surface coating

The acrylamide polymer(B) of this invention may be suitably used as an additive for paper making such as a paper strength agent and a surface coating.

Paper strength agents may be generally divided into those added to a pulp slurry and those applied, impregnated or sprayed on a wet or dry paper web. The acrylamide polymer of this invention may be used in both application types.

The acrylamide polymer(B) of this invention, when used for an additive for paper making, may be used not only alone but also in combination with a variety of agents including various polymers such as conventionally used starches, PVAs, carboxymethyl celluloses and polyacrylamides; size agents such as rosins and synthetic size agents; drainage aids; retention aids; waterproof agents; mold releases; defoaming agents; rust-preventive agents; and ion-mounting media, to be used as a more functional paper strength agent or surface coating.

When used as a paper strength agent or surface coating, the acrylamide polymer(B) of this invention is preferably in a form of an aqueous solution. In such an application, of course, a higher polymer concentration is economically preferable. The concentration may be, however, selected so that the solution has a coefficient of viscosity up to 50,000 cps(centipoise), preferably up to 30,000 cps in view of its workability during delivery and/or use, more preferably up to 20,000 cps.

The polymer according to this invention may exhibit better effects as a paper strength agent or surface coating than one according to the prior art. To date it is unclear why the acrylamide polymer(B) with such excellent properties can be provided, but it may be speculated that controlling a molecular disposition would consequently enhance polymer's interaction with a pulp fiber or aluminum sulfate molecule used in a wet end in comparison with a known polymer.

Polymer (C)

The polymer (C) prepared by Hofmann degradation of the polymer (B) of this invention may be used as a paper strength agent, which provides an excellent Z-axis and freeness.

The polymer (B) as a starting material may be used in the reaction as it is when the preparation is conducted in an aqueous solution, or may be diluted if needed. If the polymer (B) is prepared in another solvent, the solvent may be replaced with an aqueous one before initiating the reaction. The solvent in the previous step may be contained as long as it may not affect the performance or the workability of the product obtained by Hofmann degradation. Hofmann degradation is a reaction where an amide group in a polymer is attacked by a hypohalous acid in the presence of an alkaline compound. Hypohalous acids include hypochlorous acid, hypobromous acid and hypoiodous acid.

Hypohalous acid salts include alkali metal and alkaline earth metal salts of hypochlorous acid such as sodium hypochlorite, potassium hypochlorite, lithium hypochlorite, calcium hypochlorite, magnesium hypochlorite and barium hypochlorite, as well as alkali metal and alkaline earth metal salts of hypobromous and hypoiodous acids. Alternatively, a halogen gas may be introduced into an alkaline solution to generate a hypohalous acid salt.

Alkaline compounds include alkali metal hydroxides, alkaline earth metal hydroxides and alkali metal carbonates, preferably alkali metal hydroxides such as sodium hydroxide, potassium hydroxide and lithium hydroxide.

The amounts of the above materials in relation to the polymer (B) are 0.05 to 2 mol, preferably 0.1 to 1.5 mol to 1 mol amide group for a hypohalous acid salt and 0.05 to 4 mol, preferably 0.1 to 3.0 mol to 1 mol amide group for an alkaline compound.

Hofmann degradation is conducted at an alkaline pH within 8 to 14, preferably 11 to 14. In the reaction the concentration of the polymer (B) is about 0.1 to 17.5 wt %, but since a higher concentration makes stirring difficult and thus is apt to cause gelatinization, it is preferably 0.1 to 10 wt %. When Hofmann degradation is conducted at a higher temperature for a shorter period, it is again preferable that the concentration is 1 to 10 wt % because the reaction may be inappropriately slow when the concentration is less than 1 wt %.

Hofmann degradation may be conducted at a temperature of 50 to 110° C. A temperature within a higher region of 65 to 100° C. rather than a lower region is preferable because a resulting polymer has better effects as a paper strength agent. A reaction time depends on a reaction temperature and a polymer concentration in a reaction solution and thus cannot be generally described, but for example, when the polymer concentration is 1 wt %, tens of minutes at 50° C., several minutes at 65° C. and tens of seconds at 80° C. may be adequate. As the polymer concentration increases, the reaction time may be reduced.

It is recommended that after Hofmann degradation under the above conditions, the reaction is quenched for minimizing side reactions, although quenching may not be necessary when the resulting solution is used immediately after the reaction.

The reaction may be quenched by appropriate procedures such as (1)adding a reducing agent, (2)cooling the system and (3) lowering the pH of the solution with an acid, alone or in combination thereof.

The procedure (1) inactivates reactive species such as the remaining hypohalous acid salt by their reaction with the reducing agent such as sodium sulfite, sodium thiosulfate, ethyl malonate, thioglycerol and triethylamine. The amount of the reducing agent is generally 0.005 to 0.15 moles, preferably 0.01 to 0.10 moles per one mole of the hypohalous acid salt used in the reaction.

The procedure (2) depresses the reaction by cooling, for which a heat exchanger or diluting with cold water may be employed. The temperature may be reduced to generally below 50° C., preferably below 45° C., more preferably below 40° C.

The procedure (3) decreases the pH of the reaction solution which is generally 12 to 13 at the end of the reaction, to quench Hofmann degradation while inhibiting hydrolysis. The pH may be decreased to below a neutral region, preferably 4 to 6. Acids which may be used for pH adjustment, include inorganic acids such as hydrochloric acid, sulfuric acid, phosphoric acid and nitric acid; and organic acids such as formic acid, acetic acid and citric acid.

The reaction solution after quenching described above may be used as the cationic polymer (C) as it is, or the aqueous solution may be poured into a solvent such as methanol which does not dissolve the cationic polymer (C) to precipitate the polymer, which is then dried to a powder. The cationic polymer (C) may be stored in a tank and used when needed. A storage temperature may be a low temperature at which the aqueous solution is not frozen, preferably 10 to 15° C.

Applications of the cationic polymer (C)

The cationic polymer (C) may be used in a process of sheet forming of a paper or cardboard. The polymer may be added as a paper strength agent or drainage aid with significant effects. The cationic polymer (C) may be added in a paper strength agent or drainage aid to an effective amount for providing required effects, or may be used alone.

The cationic polymer (C) may be used in sheet forming according to a well-known procedure, and used alone or preferably in combination with other agents such as aluminum sulfate and anionic resins including anionic acrylamide polymers if necessary.

The ratio between the cationic polymer (C) and the anionic resin may be arbitrarily selected, preferably 100:0 to 10:90 as a weight ratio of solids. Their amount is 0.01 to 5 wt %, preferably 0.05 to 2 wt % to the weight of the dry pulp solid.

They may be added at any point before forming a wet sheet and in any order or at the same time, although even after forming a wet sheet, they may be added by spray or roll-coater application, especially for producing a joined paper.

The cationic acrylamide polymer of this invention produced by Hofmann reaction of an acrylamide polymer with an controlled branched and cross-linked structure can improve particularly a Z-axis directional strength and a freeness even under harsh papermaking conditions such as increase of a waste paper.

Thus, when used for a product such as a corrugated paper and a newspaper in which a waste paper may be used in a significant proportion, the polymer of this invention may be considerably effective to provide a paper with an improved paper strength. Furthermore, it has many significant advantages; for example, an overall amount of additives for papermaking may be reduced, leading to cost reduction in papermaking and reduction of unfixed resins which may cause contamination in the papermaking system.

This invention will be more specifically described by, but not limited to, the following Examples and Comparative Examples, where % represents wt % unless otherwise indicated.

The measurement conditions in GPC-MALLS, i.e., measurement by a GPC-MALLS technique where a GPC is connected with a multi-angle light scattering detector, in Examples and Comparative Examples, are as follows:

GPC body: System 11, Showa Denko K.K.;
Column: SHODEX SB 80M;
Eluent: a N/15 phosphate buffer(pH 7) containing N/10 sodium nitrate;
Flow rate: 1.0 mL/min;
Detector: a multi-angle light scattering detector DAWN, Wyatt Technology Company.

EXAMPLE 1

In a five-necked flask equipped with an agitator, a reflux condenser, a thermometer, a nitrogen-inlet tube and a dropping inlet (hereinafter, referred to as a "reaction vessel") was placed 201.33 g of purified water, and then the internal temperature was adjusted to 80° C. while introducing nitrogen gas.

A solution of 18.64 g of 80% (hereinafter, % represents wt % unless otherwise indicated) acrylic acid and 3.27 g of sodium methallylsulfonate and an aqueous solution(60 g) of 0.24 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 80° C. for 4 hours, to provide a polymer A.

Subsequently a solution of 549.89 g of 50% acrylamide, 0.32 g of methylene bisacrylamide and 6.55 g of sodium methallylsulfonate and an aqueous solution(60 g) of 0.37 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 8 hours, to provide a polymer B.

While cooling the polymer solution, the proportion of the nonvolatile component was adjusted by adding water, to give an aqueous solution of an anionic polymer containing 30% of the nonvolatile component with a Brookfield viscosity of 6290 cps at 25° C. The polymer is designated as M-1.

The weight-average molecular weight of M-1 by GPC-MALLS was 4,500,000.

EXAMPLE 2

In the above reaction vessel was placed 221.84 g of purified water, and then the internal temperature was adjusted to 80° C. while introducing nitrogen gas.

A solution of 36.58 g of 80% acrylic acid and 6.42 g of sodium methallylsulfonate and an aqueous solution(60 g) of 0.24 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 80° C. for 3 hours, to provide a polymer A.

Subsequently a solution of 501.68 g of 50% acrylamide, 0.63 g of methylene bisacrylamide and 12.85 g of sodium methallylsulfonate and an aqueous solution(60 g) of 0.73 g of 4,4'-azobis-4-cyanovaleric acid(purity: 84%) were prepared and simultaneously added dropwise at constant rates into the reaction vessel over 240 min, maintaining the internal temperature at 80° C. After addition, polymerization was continued at 80° C. for 5 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 6640 cps at 25° C. The polymer is designated as M-2.

The weight-average molecular weight of M-2 by GPC-MALLS was 4,910,000.

EXAMPLE 3

In the above reaction vessel was placed 228.27 g of purified water, and then the internal temperature was adjusted to 80° C. while introducing nitrogen gas.

A solution of 56.98 g of 50% acrylamide, 36.12 g of 80% acrylic acid and 6.34 g of sodium methallylsulfonate and an aqueous solution(60 g) of 0.24 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 80° C. for 5 hours, to provide a polymer A.

Subsequently a solution of 432.02 g of 50% acrylamide, 1.24 g of methylene bisacrylamide and 19.02 g of sodium methallylsulfonate and an aqueous solution(60 g) of 1.71 g of 4,4'-azobis-4-cyanovaleric acid(purity: 84%) were prepared and simultaneously added dropwise at constant rates into the reaction vessel over 300 min, maintaining the internal temperature at 90° C. After addition, polymerization was continued at 90° C. for 3 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 8730 cps at 25° C. The polymer is designated as M-3.

The weight-average molecular weight of M-3 by GPC-MALLS was 5,930,000.

EXAMPLE 4

In the above reaction vessel was placed 238.79 g of purified water, and then the internal temperature was adjusted to 80° C. while introducing nitrogen gas.

A solution of 28.49 g of 50% acrylamide, 54.17 g of 80% acrylic acid and 9.51 g of sodium methallylsulfonate and an aqueous solution(60 g) of 1.47 g of 4,4'-azobis-4-cyanovaleric acid(purity: 84%) were prepared, and simultaneously added dropwise at constant rates into the reaction vessel over 90 min, maintaining the internal temperature at 80° C. After addition, polymerization was continued at 80° C. for 2 hours, to provide a polymer A.

Subsequently a solution of 432.26 g of 50% acrylamide, 0.93 g of methylene bisacrylamide and 15.85 g of sodium methallylsulfonate and an aqueous solution(60 g) of 1.22 g of 4,4'-azobis-4-cyanovaleric acid(purity: 84%) were prepared and simultaneously added dropwise at constant rates into the reaction vessel over 150 min, maintaining the internal temperature at 80° C. After addition, polymerization was continued at 80° C. for 5 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 8080 cps at 25° C. The polymer is designated as M-4.

The weight-average molecular weight of M-4 by GPC-MALLS was 5,850,000.

EXAMPLE 5

In the above reaction vessel was placed 236.22 g of purified water, and then the internal temperature was adjusted to 90° C. while introducing nitrogen gas.

A solution of 24.84 g of itaconic acid and 12.08 g of sodium methallylsulfonate and an aqueous solution(60 g) of 1.47 g of 4,4'-azobis-4-cyanovaleric acid(purity: 84%) were prepared, and simultaneously added dropwise at constant rates into the reaction vessel over 60 min, maintaining the internal temperature at 90° C. After addition, polymerization was continued at 90° C. for 5 hours, to provide a polymer A.

Subsequently a solution of 487.55 g of 50% acrylamide, 1.18 g of methylene bisacrylamide and 18.12 g of sodium methallylsulfonate and an aqueous solution(60 g) of 1.71 g of 4,4'-azobis-4-cyanovaleric acid(purity: 84%) were prepared and simultaneously added dropwise at constant rates into the reaction vessel over 150 min, maintaining the internal temperature at 90° C. After addition, polymerization was continued at 80° C. for 5 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 7570 cps at 25° C. The polymer is designated as M-5.

The weight-average molecular weight of M-5 by GPC-MALLS was 4,780,000.

EXAMPLE 6

In the above reaction vessel was placed 265.49 g of purified water, and then the internal temperature was adjusted to 90° C. while introducing nitrogen gas.

A solution of 47.13 g of itaconic acid and 17.19 g of sodium methallylsulfonate and an aqueous solution(60 g) of 1.47 g of 4,4'-azobis-4-cyanovaleric acid(purity: 84%) were prepared, and simultaneously added dropwise at constant rates into the reaction vessel over 90 min, maintaining the internal temperature at 90° C. After addition, polymerization was continued at 90° C. for 2 hours, to provide a polymer A.

Subsequently a solution of 429.01 g of 50% acrylamide, 1.12 g of methylene bisacrylamide and 20.05 g of sodium methallylsulfonate and an aqueous solution(60 g) of 1.59 g of 4,4'-azobis-4-cyanovaleric acid(purity: 84%) were prepared and simultaneously added dropwise at constant rates into the reaction vessel over 150 min, maintaining the internal temperature at 80° C. After addition, polymerization was continued at 90° C. for 4 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 6930 cps at 25° C. The polymer is designated as M-6.

The weight-average molecular weight of M-6 by GPC-MALLS was 4,840,000.

EXAMPLE 7

In the above reaction vessel was placed 226.72 g of purified water, and then the internal temperature was adjusted to 80° C. while introducing nitrogen gas.

A solution of 38.61 g of 50% acrylamide, 15.14 g of itaconic acid and 12.27 g of sodium methallylsulfonate and an aqueous solution(60 g) of 0.73 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 80° C. for 5 hours, to provide a polymer A.

Subsequently a solution of 467.96 g of 50% acrylamide, 0.90 g of methylene bisacrylamide and 18.41 g of sodium methallylsulfonate and an aqueous solution(60 g) of 1.10 g of 4,4'-azobis-4-cyanovaleric acid(purity: 84%) were prepared and simultaneously added dropwise at constant rates into the reaction vessel over 150 min, maintaining the internal temperature at 80° C. After addition, polymerization was continued at 80° C. for 5 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 6470 cps at 25° C. The polymer is designated as M-7.

The weight-average molecular weight of M-7 by GPC-MALLS was 4,780,000.

EXAMPLE 8

In the above reaction vessel was placed 246.46 g of purified water, and then the internal temperature was adjusted to 90° C. while introducing nitrogen gas.

A solution of 64.13 g of 50% acrylamide, 39.17 g of itaconic acid and 11.89 g of sodium methallylsulfonate and an aqueous solution(60 g) of 1.47 g of 4,4'-azobis-4-cyanovaleric acid(purity: 84%) were prepared, and simultaneously added dropwise at constant rates into the reaction vessel over 90 min, maintaining the internal temperature at 90° C. After addition, polymerization was continued at 90° C. for 6 hours, to provide a polymer A.

Subsequently a solution of 402.95 g of 50% acrylamide, 0.58 g of methylene bisacrylamide and 14.86 g of sodium methallylsulfonate and an aqueous solution(60 g) of 0.61 g of 4,4'-azobis-4-cyanovaleric acid(purity: 84%) were prepared and simultaneously added dropwise at constant rates into the reaction vessel over 150 min, maintaining the internal temperature at 80° C. After addition, polymerization was continued at 80° C. for 4 hours, to provide a polymer B. While cooling the polymer solution, the proportion of the nonvolatile component was adjusted by adding water, to give an aqueous solution of an anionic polymer containing 30% of the nonvolatile component with a Brookfield viscosity of 5500 cps at 25° C. The polymer is designated as M-8.

The weight-average molecular weight of M-8 by GPC-MALLS was 4,430,000.

Comparative Example 1

In the above reaction vessel was placed 201.33 g of purified water, and then the internal temperature was adjusted to 80° C. while introducing nitrogen gas.

A solution of 549.89 g of 50% acrylamide, 18.64 g of 80% acrylic acid, 9.82 g of sodium methallylsulfonate and 0.32 g of methylene bisacrylamide in 18.19 g of distilled water and an aqueous solution(120 g) of 0.24 g of 4,4'-azobis-4-cyanovaleric acid(purity: 84%) were prepared, and simultaneously added dropwise at constant rates into the reaction vessel over 240 min, maintaining the internal temperature at 80° C. After addition, polymerization was continued at 80° C. for 8 hours. While cooling the polymer solution, the proportion of the nonvolatile component was adjusted by adding water, to give an aqueous solution of an anionic polymer containing 30% of the nonvolatile component with a Brookfield viscosity of 8180 cps at 25° C. The polymer is designated as N-1.

The weight-average molecular weight of N-1 by GPC-MALLS was 1,950,000.

Comparative Example 2

In the above reaction vessel was placed 221.84 g of purified water, and then the internal temperature was adjusted to 80° C. while introducing nitrogen gas.

A solution of 501.68 g of 50% acrylamide, 36.58 g of 80% acrylic acid, 19.27 g of sodium methallylsulfonate and 0.63 g of methylene bisacrylamide and an aqueous solution(120 g) of 0.49 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 3 hours. While cooling the polymer solution, the proportion of the nonvolatile component was adjusted by adding water, to give an aqueous solution of an anionic polymer containing 30% of the nonvolatile component with a Brookfield viscosity of 8690 cps at 25° C. The polymer is designated as N-2.

The weight-average molecular weight of N-2 by GPC-MALLS was 2,240,000.

Comparative Example 3

In the above reaction vessel was placed 228.27 g of purified water, and then the internal temperature was adjusted to 80° C. while introducing nitrogen gas.

A solution of 432.02 g of 50% acrylamide, 36.12 g of 80% acrylic acid, 25.36 g of sodium methallylsulfonate and 1.24 g of methylene bisacrylamide and an aqueous solution(120 g) of 1.47 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 5 hours. While cooling the polymer solution, the proportion of the nonvolatile component was adjusted by adding water, to give an aqueous solution of an anionic polymer containing 30% of the nonvolatile component with a Brookfield viscosity of 11050 cps at 25° C. The polymer is designated as N-3.

The weight-average molecular weight of N-3 by GPC-MALLS was 1,840,000.

Comparative Example 4

In a five-necked flask equipped with an agitator, a reflux condenser, a thermometer, a nitrogen-inlet tube and a dropping inlet(hereinafter, referred to as a "reaction vessel") was placed 238.79 g of purified water, and then the internal temperature was adjusted to 80° C. while introducing nitrogen gas.

A solution of 460.75 g of 50% acrylamide, 54.17 g of 80% acrylic acid, 25.36 g of sodium methallylsulfonate and 0.93 g of methylene bisacrylamide and an aqueous solution(120 g) of 1.22 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 3 hours. While cooling the polymer solution, the proportion of the nonvolatile component was adjusted by adding water, to give an aqueous solution of an anionic polymer containing 30% of the nonvolatile component with a Brookfield viscosity of 11550 cps at 25° C. The polymer is designated as N-4.

The weight-average molecular weight of N-4 by GPC-MALLS was 3,460,000.

Comparative Example 5

In the above reaction vessel was placed 236.22 g of purified water, and then the internal temperature was adjusted to 80° C. while introducing nitrogen gas.

A solution of 487.55 g of 50% acrylamide, 24.84 g of itaconic acid, 30.20 g of sodium methallylsulfonate and 1.18 g of methylene bisacrylamide and an aqueous solution(120 g) of 1.22 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 5 hours. While cooling the polymer solution, the proportion of the nonvolatile component was adjusted by adding water, to give an aqueous solution of an anionic polymer containing 30% of the nonvolatile component with a Brookfield viscosity of 9440 cps at 25° C. The polymer is designated as N-5.

The weight-average molecular weight of N-5 by GPC-MALLS was 1,960,000.

Comparative Example 6

In the above reaction vessel was placed 265.49 g of purified water, and then the internal temperature was adjusted to 80° C. while introducing nitrogen gas.

A solution of 429.01 g of 50% acrylamide, 47.13 g of itaconic acid, 37.24 g of sodium methallylsulfonate and 1.12 g of methylene bisacrylamide and an aqueous solution(120 g) of 0.85 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 2 hours. While cooling the polymer solution, the proportion of the nonvolatile component was adjusted by adding water, to give an aqueous solution of an anionic polymer containing 30% of the nonvolatile component with a Brookfield viscosity of 8750 cps at 25° C. The polymer is designated as N-6.

The weight-average molecular weight of N-6 by GPC-MALLS was 2,580,000.

Comparative Example 7

In the above reaction vessel was placed 226.72 g of purified water, and then the internal temperature was adjusted to 80° C. while introducing nitrogen gas.

A solution of 471.57 g of 50% acrylamide, 15.14 g of itaconic acid, 30.68 g of sodium methallylsulfonate and 0.90 g of methylene bisacrylamide and an aqueous solution(120 g) of 0.61 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 5 hours. While cooling the polymer solution, the proportion of the nonvolatile component was adjusted by adding water, to give an aqueous solution of an anionic polymer containing 30% of the nonvolatile component with a Brookfield viscosity of 8560 cps at 25° C. The polymer is designated as N-7.

The weight-average molecular weight of N-7 by GPC-MALLS was 2,560,000.

Comparative Example 8

In the above reaction vessel was placed 246.46 g of purified water, and then the internal temperature was adjusted to 80° C. while introducing nitrogen gas.

A solution of 467.08 g of 50% acrylamide, 39.17 g of itaconic acid, 26.75 g of sodium methallylsulfonate and 0.58 g of methylene bisacrylamide and an aqueous solution(120 g) of 0.50 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 3 hours. While cooling the polymer solution, the proportion of the nonvolatile component was adjusted by adding water, to give an aqueous solution of an anionic polymer containing 30% of the nonvolatile component with a Brookfield viscosity of 8110 cps at 25° C. The polymer is designated as N-8.

The weight-average molecular weight of N-8 by GPC-MALLS was 3,670,000.

The compositions and the physical properties of the polymers from the above Examples and Comparative Examples are summarized in Tables 1 and 2.

TABLE 1-1

| | | Composition (mol %) | | | | Polymer A/Polymer B ratio | Polymer No |
|---|---|---|---|---|---|---|---|
| Example 1 | Polymer A (Monomer 1) | | AA 5.0 | | SMS 0.5 | | M-1 |
| | Monomer 2 | AM 93.45 | | | MBA 0.05 SMS 1.0 | | |
| | Polymer B | AM 93.45 | AA 5.0 | | MBA 0.05 SMS 1.5 | 0.055 | |
| Example 2 | Polymer A (Monomer 1) | | AA 10.0 | | SMS 1.0 | | M-2 |
| | Monomer 2 | AM 86.90 | | | MBA 0.10 SMS 2.0 | | |
| | Polymer B | AM 86.90 | AA 10.0 | | MBA 0.10 SMS 3.0 | 0.110 | |
| Example 3 | Polymer A (Monomer 1) | AM 10.00 | AA 10.0 | | SMS 1.0 | | M-3 |
| | Monomer 2 | AM 75.80 | | | MBA 0.20 SMS 3.0 | | |
| | Polymer B | AM 85.80 | AA 10.0 | | MBA 0.20 SMS 4.0 | 0.210 | |
| Example 4 | Polymer A (Monomer 1) | AM 5.00 | AA 15.0 | | SMS 1.5 | | M-4 |
| | Monomer 2 | AM 75.85 | | | MBA 0.15 SMS 2.5 | | |
| | Polymer B | AM 80.85 | AA 15.0 | | MBA 0.15 SMS 4.0 | 0.215 | |
| Example 5 | Polymer A (Monomer 1) | | | IA 5.0 | SMS 2.0 | | M-5 |
| | Monomer 2 | AM 89.80 | | | MBA 0.20 SMS 3.0 | | |
| | Polymer B | AM 89.80 | | IA 5.0 | MBA 0.20 SMS 5.0 | 0.070 | |
| Example 6 | Polymer A (Monomer 1) | | | IA 10.0 | SMS 3.0 | | M-6 |
| | Monomer 2 | AM 83.30 | | | MBA 0.20 SMS 3.5 | | |
| | Polymer B | AM 83.30 | | IA 10.0 | MBA 0.20 SMS 6.5 | 0.130 | |
| Example 7 | Polymer A (Monomer 1) | AM 7.00 | | IA 3.0 | SMS 2.0 | | M-7 |
| | Monomer 2 | AM 84.85 | | | MBA 0.15 SMS 3.0 | | |
| | Polymer B | AM 91.85 | | IA 3.0 | MBA 0.15 SMS 5.0 | 0.120 | |
| Example 8 | Polymer A (Monomer 1) | AM 12.00 | | IA 8.0 | SMS 2.0 | | M-8 |
| | Monomer 2 | AM 75.40 | | | MBA 0.10 SMS 2.5 | | |
| | Polymer B | AM 87.40 | | IA 8.0 | MBA 0.10 SMS 4.5 | 0.220 | |

AM: acrylamide, AA: acrylic acid, IA: itaconic acid, MBA: methylene bisacrylamide, SMS: sodium methallylsulfonate

TABLE 1-2

| | Composition (mol %) | | | | Polymer A/Polymer B ratio | Polymer No. |
|---|---|---|---|---|---|---|
| Comp. Example 1 | AM 93.45 | AA 5.0 | | MBA 0.05 SMS 1.5 | — | N-1 |
| Comp. Example 2 | AM 86.90 | AA 10.0 | | MBA 0.10 SMS 3.0 | — | N-2 |
| Comp. Example 3 | AM 85.80 | AA 10.0 | | MBA 0.20 SMS 4.0 | — | N-3 |
| Comp. Example 4 | AM 80.85 | AA 15.0 | | MBA 0.15 SMS 4.0 | — | N-4 |
| Comp. Example 5 | AM 89.80 | | IA 5.0 | MBA 0.20 SMS 5.0 | — | N-5 |
| Comp. Example 6 | AM 83.30 | | IA 10.0 | MBA 0.20 SMS 6.5 | — | N-6 |
| Comp. Example 7 | AM 91.85 | | IA 3.0 | MBA 0.15 SMS 5.0 | — | N-7 |
| Comp. Example 8 | AM 87.40 | | IA 8.0 | MBA 0.10 SMS 4.5 | — | N-8 |

AM: acrylamide, AA: acrylic acid, IA: itaconic acid, MBA: methylene bisacrylamide, SMS: sodium methallylsulfonate

TABLE 2

| Polymer No. | Viscosity (ps/25° C.) | Molecular Weight ($10^4$) |
|---|---|---|
| M-1 | 62.9 | 450 |
| M-2 | 66.4 | 491 |
| M-3 | 87.3 | 593 |
| M-4 | 80.8 | 585 |
| M-5 | 75.7 | 478 |
| M-6 | 69.3 | 484 |
| M-7 | 64.7 | 478 |
| M-8 | 55.0 | 443 |
| N-1 | 81.8 | 195 |
| N-2 | 86.9 | 224 |
| N-3 | 110.5 | 184 |
| N-4 | 115.5 | 346 |
| N-5 | 94.4 | 196 |
| N-6 | 87.5 | 258 |
| N-7 | 85.6 | 256 |
| N-8 | 81.1 | 367 |

TABLE 3

| Polymer No. | Burst index | Z-directional strength (kg · cm) |
|---|---|---|
| M-1 | 5.02 | 4.53 |
| M-2 | 5.08 | 4.52 |
| M-3 | 5.06 | 4.60 |
| M-4 | 5.11 | 4.58 |
| M-5 | 5.16 | 4.65 |
| M-6 | 5.21 | 4.58 |
| M-7 | 5.40 | 4.59 |
| M-8 | 5.31 | 4.52 |
| N-1 | 3.92 | 3.28 |
| N-2 | 3.95 | 3.21 |
| N-3 | 3.95 | 3.30 |
| N-4 | 3.95 | 3.35 |
| N-5 | 4.10 | 3.42 |
| N-6 | 4.08 | 3.40 |
| N-7 | 4.09 | 3.47 |
| N-8 | 4.04 | 3.42 |
| None | 3.85 | 2.96 |

Application Examples will be described, in which the polymers from the above Examples and Comparative Examples were used as an internal paper strength agent. Application Examples 1 to 8 and Comparative Application Examples 1 to 8

To an L-BKP 1% slurry with a beating degree of CSF (Canadian Standard Freeness) 400 obtained from waste corrugated papers was added aluminum sulfate in an amount of 2% to the pulp, and then the mixture was stirred for 3 min. The pH of the pulp slurry was 4.5. A 1% aqueous solution of the polymer M-1 was added in an amount of 0.5% to the pulp on nonvolatile-component basis with stirring, and the mixture was further stirred for 3 min. Then, the resulting pulp slurry was used to make a paper with a TAPPI standard (square) sheet machine. The wet sheet thus made was dried in a drum dryer at 110° C. for 3 min, to give a hand-made paper with a basis weight of 100 g/m². The dried paper was subject to humidity control in an air-conditioned chamber at 20° C. and RH 65% for at least 24 hours, and its burst index(JIS-P8112) and Z-axis directional strength(Internal Bond Tester; Kumagaya Riki Kogyo) were determined. The polymers M-2 to M-8 and N-1 to N-8 were processed and evaluated as described above. The results are shown in Table 3.

EXAMPLE 9

In the above reaction vessel was placed 214.86 g of purified water, and then the internal temperature was adjusted to 80° C. while introducing nitrogen gas.

A solution of 24.85 g of N,N-dimethylaminoethyl methacrylate and 3.13 g of sodium methallylsulfonate whose pH was adjusted to 4.2 with 35% HCl and an aqueous solution (60 g) of 0.49 g of 4,4'-azobis-4-cyanovaleric acid(purity: 84%) were prepared, and simultaneously added dropwise at constant rates into the reaction vessel over 120 min, maintaining the internal temperature at 80° C. After addition, polymerization was continued at 80° C. for 4 hours, to provide a polymer A.

Subsequently a solution of 530.33 g of 50% acrylamide, 0.61 g of methylene bisacrylamide and 6.25 g of sodium methallylsulfonate whose pH was adjusted to 4.2 with 35% HCl and an aqueous solution(60 g) of 0.93 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 4 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 5170 cps at 25° C. The polymer is designated as M-9.

The weight-average molecular weight of M-9 by GPC-MALLS was 2,460,000.

EXAMPLE 10

In the above reaction vessel was placed 262.84 g of purified water, and then the internal temperature was adjusted to 80° C. while introducing nitrogen gas.

A solution of 67.57 g of N,N-dimethylaminoethyl methacrylate and 2.83 g of sodium methallylsulfonate whose pH was adjusted to 4.2 with 35% HCl and an aqueous solution (60 g) of 0.49 g of 4,4'-azobis-4-cyanovaleric acid(purity: 84%) were prepared, and simultaneously added dropwise at constant rates into the reaction vessel over 120 min, maintaining the internal temperature at 80° C. After addition, polymerization was continued at 80° C. for 6 hours, to provide a polymer A.

Subsequently a solution of 434.33 g of 50% acrylamide, 1.10 g of methylene bisacrylamide and 11.33 g of sodium methallylsulfonate whose pH was adjusted to 4.2 with 35% HCl and an aqueous solution(60 g) of 1.71 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 4 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 6020 cps at 25° C. The polymer is designated as M-10.

The weight-average molecular weight of M-10 by GPC-MALLS was 3,460,000.

EXAMPLE 11

In the above reaction vessel was placed 243.66 g of purified water, and then the internal temperature was adjusted to 80° C. while introducing nitrogen gas.

A solution of 35.30 g of N,N-dimethylaminoethyl methacrylate, 9.74 g of itaconic acid and 5.92 g of sodium methallylsulfonate whose pH was adjusted to 4.2 with 35% HCl and an aqueous solution(60 g) of 0.49 g of 4,4'-azobis-4-cyanovaleric acid(purity: 84%) were prepared, and simultaneously added dropwise at constant rates into the reaction vessel over 120 min, maintaining the internal temperature at 80° C. After addition, polymerization was continued at 80° C. for 4 hours, to provide a polymer A.

Subsequently a solution of 472.68 g of 50% acrylamide, 0.87 g of methylene bisacrylamide and 11.84 g of sodium methallylsulfonate whose pH was adjusted to 4.2 with 35% HCl and an aqueous solution(60 g) of 1.78 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 5 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 3830 cps at 25° C. The polymer is designated as M-11.

The weight-average molecular weight of M-11 by GPC-MALLS was 2,360,000.

EXAMPLE 12

In the above reaction vessel was placed 273.19 g of purified water, and then the internal temperature was adjusted to 80° C. while introducing nitrogen gas.

A solution of 66.29 g of N,N-dimethylaminoethyl methacrylate, 9.14 g of itaconic acid and 5.56 g of sodium methallylsulfonate whose pH was adjusted to 4.2 with 35% HCl and an aqueous solution(60 g) of 0.73 g of 4,4'-azobis-4-cyanovaleric acid(purity: 84%) were prepared, and simultaneously added dropwise at constant rates into the reaction vessel over 90 min, maintaining the internal temperature at 80° C. After addition, polymerization was continued at 80° C. for 6 hours, to provide a polymer A.

Subsequently a solution of 413.62 g of 50% acrylamide, 1.08 g of methylene bisacrylamide and 11.15 g of sodium methallylsulfonate whose pH was adjusted to 4.2 with 35% HCl and an aqueous solution(60 g) of 1.66 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 4 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 5620 cps at 25° C. The polymer is designated as M-12.

The weight-average molecular weight of M-12 by GPC-MALLS was 3,440,000.

EXAMPLE 13

In the above reaction vessel was placed 247.19 g of purified water, and then the internal temperature was adjusted to 80° C. while introducing nitrogen gas.

A solution of 52.74 g of 50% acrylamide, 46.66 g of N,N-dimethylaminoethyl methacrylate, 4.83 g of itaconic acid and 5.87 g of sodium methallylsulfonate whose pH was adjusted to 4.2 with 35% HCl and an aqueous solution(60 g) of 0.98 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 80° C. for 6 hours, to provide a polymer A.

Subsequently a solution of 413.23 g of 50% acrylamide, 0.86 g of methylene bisacrylamide and 8.80 g of sodium methallylsulfonate whose pH was adjusted to 4.2 with 35% HCl and an aqueous solution(60 g) of 1.17 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 4 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 5800 cps at 25° C. The polymer is designated as M-13.

The weight-average molecular weight of M-13 by GPC-MALLS was 2,940,000.

EXAMPLE 14

In the above reaction vessel was placed 302.94 g of purified water, and then the internal temperature was adjusted to 80° C. while introducing nitrogen gas.

A solution of 70.26 g of 50% acrylamide, 77.70 g of N,N-dimethylaminoethyl methacrylate, 17.15 g of itaconic acid and 10.42 g of sodium methallylsulfonate whose pH was adjusted to 4.2 with 35% HCl and an aqueous solution (60 g) of 0.84 g of 2,2'-azobis-2-(2-imidazolin-2-yl) were prepared, and simultaneously added dropwise at constant rates into the reaction vessel over 120 min, maintaining the internal temperature at 80° C. After addition, polymerization was continued at 80° C. for 3 hours, to provide a polymer A.

Subsequently a solution of 283.86 g of 50% acrylamide, 2.03 g of methylene bisacrylamide and 15.63 g of sodium methallylsulfonate whose pH was adjusted to 4.2 with 35% HCl and an aqueous solution(60 g) of 2.74 g of 2,2'-azobis-2-(2-imidazolin-2-yl) were prepared and simultaneously added dropwise at constant rates into the reaction vessel over 180 min, maintaining the internal temperature at 80° C. After addition, polymerization was continued at 80° C. for 4 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 8090 cps at 25° C. The polymer is designated as M-14.

The weight-average molecular weight of M-14 by GPC-MALLS was 3,920,000.

EXAMPLE 15

In the above reaction vessel was placed 249.42 g of purified water, and then the internal temperature was adjusted to 80° C. while introducing nitrogen gas.

A solution of 105.59 g of 50% acrylamide, 29.19 g of N,N-dimethylaminoethyl methacrylate, 4.83 g of itaconic acid and 5.87 g of sodium methallylsulfonate whose pH was adjusted to 4.2 with 35% HCl and an aqueous solution(60 g) of 0.98 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 80° C. for 6 hours, to provide a polymer A.

Subsequently a solution of 355.58 g of 50% acrylamide, 16.91 g of itaconic acid, 0.86 g of methylene bisacrylamide and 11.75 g of sodium methallylsulfonate whose pH was adjusted to 4.2 with 35% HCl and an aqueous solution(60 g) of 1.00 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 8 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 4100 cps at 25° C. The polymer is designated as M-15.

The weight-average molecular weight of M-15 by GPC-MALLS was 3,090,000.

EXAMPLE 16

In the above reaction vessel was placed 280.98 g of purified water, and then the internal temperature was adjusted to 80° C. while introducing nitrogen gas.

A solution of 64.04 g of 50% acrylamide, 54.48 g of N,N-dimethylaminoethyl methacrylate, 4.51 g of itaconic acid and 10.96 g of sodium methallylsulfonate whose pH was adjusted to 4.2 with 35% HCl and an aqueous solution (60 g) of 1.47 g of 4,4'-azobis-4-cyanovaleric acid(purity: 84%) were prepared, and simultaneously added dropwise at constant rates into the reaction vessel over 60 min, maintaining the internal temperature at 80° C. After addition, polymerization was continued at 90° C. for 1 hour, to provide a polymer A.

Subsequently a solution of 333.99 g of 50% acrylamide, 13.53 g of itaconic acid, 1.07 g of methylene bisacrylamide and 16.44 g of sodium methallylsulfonate whose pH was adjusted to 4.2 with 35% HCl and an aqueous solution(60 g) of 1.26 g of 4,4'-azobis-4-cyanovaleric acid(purity: 84%) were prepared and simultaneously added dropwise at constant rates into the reaction vessel over 120 min, maintaining the internal temperature at 90° C. After addition, polymerization was continued at 80° C. for 2 hours, to provide a polymer B. While cooling the polymer solution, the proportion of the nonvolatile component was adjusted by adding water, to give an aqueous solution of an amphoteric polymer containing 30% of the nonvolatile component with a Brookfield viscosity of 3670 cps at 25° C. The polymer is designated as M-16.

The weight-average molecular weight of M-16 by GPC-MALLS was 3,770,000.

Comparative Example 9

In the above reaction vessel was placed 214.84 g of purified water, and then the internal temperature was adjusted to 80° C. while introducing nitrogen gas.

A solution of 530.33 g of 50% acrylamide, 24.85 g of N,N-dimethylaminoethyl methacrylate, 0.61 g of methylene bisacrylamide and 9.15 g of sodium methallylsulfonate whose pH was adjusted to 4.2 with 35% HCl and an aqueous solution(120 g) of 0.66 g of 4,4'-azobis-4-cyanovaleric acid (purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 9390 cps at 25° C. The polymer is designated as N-9.

The weight-average molecular weight of N-9 by GPC-MALLS was 629,000.

Comparative Example 10

In the above reaction vessel was placed 262.84 g of purified water, and then the internal temperature was adjusted to 80° C. while introducing nitrogen gas.

A solution of 434.33 g of 50% acrylamide, 67.57 g of N,N-dimethylaminoethyl methacrylate, 1.10 g of methylene bisacrylamide and 14.16 g of sodium methallylsulfonate whose pH was adjusted to 4.2 with 35% HCl and an aqueous solution(120 g) of 1.25 g of 4,4'-azobis-4-cyanovaleric acid (purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 11900 cps at 25° C. The polymer is designated as N-10.

The weight-average molecular weight of N-10 by GPC-MALLS was 775,000.

Comparative Example 11

In the above reaction vessel was placed 243.66 g of purified water, and then the internal temperature was adjusted to 80° C. while introducing nitrogen gas.

A solution of 472.68 g of 50% acrylamide, 35.30 g of N,N-dimethylaminoethyl methacrylate, 9.14 g of itaconic acid, 0.87 g of methylene bisacrylamide and 17.76 g of sodium methallylsulfonate whose pH was adjusted to 4.2 with 35% HCl and an aqueous solution(120 g) of 0.81 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 7850 cps at 25° C. The polymer is designated as N-11.

The weight-average molecular weight of N-11 by GPC-MALLS was 974,000.

Comparative Example 12

In the above reaction vessel was placed 273.19 g of purified water, and then the internal temperature was adjusted to 80° C. while introducing nitrogen gas.

A solution of 413.62 g of 50% acrylamide, 66.29 g of N,N-dimethylaminoethyl methacrylate, 9.14 g of itaconic acid, 1.08 g of methylene bisacrylamide and 116.67 g of sodium methallylsulfonate whose pH was adjusted to 4.2 with 35% HCl and an aqueous solution(120 g) of 1.12 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 10300 cps at 25° C. The polymer is designated as N-12.

The weight-average molecular weight of N-12 by GPC-MALLS was 913,000.

Comparative Example 13

In the above reaction vessel was placed 247.19 g of purified water, and then the internal temperature was adjusted to 80° C. while introducing nitrogen gas.

A solution of 465.97 g of 50% acrylamide, 46.66 g of N,N-dimethylaminoethyl methacrylate, 4.83 g of itaconic acid, 0.86 g of methylene bisacrylamide and 14.36 g of sodium methallylsulfonate whose pH was adjusted to 4.2 with 35% HCl and an aqueous solution(120 g) of 0.84 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 9250 cps at 25° C. The polymer is designated as N-13.

The weight-average molecular weight of N-13 by GPC-MALLS was 904,000.

Comparative Example 14

In the above reaction vessel was placed 302.94 g of purified water, and then the internal temperature was adjusted to 80° C. while introducing nitrogen gas.

A solution of 354.12 g of 50% acrylamide, 77.70 g of N,N-dimethylaminoethyl methacrylate, 17.15 g of itaconic acid, 2.03 g of methylene bisacrylamide and 26.07 g of sodium methallylsulfonate whose pH was adjusted to 4.2 with 35% HCl and an aqueous solution(120 g) of 2.52 g of 2,2'-azobis-2-(2-imidazolin-2-yl) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 11700 cps at 25° C. The polymer is designated as N-14.

The weight-average molecular weight of N-14 by GPC-MALLS was 712,000.

Comparative Example 15

In the above reaction vessel was placed 249.42 g of purified water, and then the internal temperature was adjusted to 80° C. while introducing nitrogen gas.

A solution of 461.17 g of 50% acrylamide, 29.19 g of N,N-dimethylaminoethyl methacrylate, 16.58 g of itaconic acid, 0.86 g of methylene bisacrylamide and 17.62 g of sodium methallylsulfonate whose pH was adjusted to 4.2 with 35% HCl and an aqueous solution(120 g) of 0.85 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 7710 cps at 25° C. The polymer is designated as N-15.

The weight-average molecular weight of N-15 by GPC-MALLS was 903,000.

Comparative Example 16

In the above reaction vessel was placed 280.98 g of purified water, and then the internal temperature was adjusted to 80° C. while introducing nitrogen gas.

A solution of 398.03 g of 50% acrylamide, 54.48 g of N,N-dimethylaminoethyl methacrylate, 18.04 g of itaconic acid, 1.07 g of methylene bisacrylamide and 27.40 g of sodium methallylsulfonate whose pH was adjusted to 4.2 with 35% HCl and an aqueous solution(120 g) of 0.73 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution, the proportion of the nonvolatile component was adjusted by adding water, to give an aqueous solution of an amphoteric polymer containing 30% of the nonvolatile component with a Brookfield viscosity of 7230 cps at 25° C. The polymer is designated as N-16.

The weight-average molecular weight of N-16 by GPC-MALLS was 1,710,000.

The compositions and the physical properties of the polymers from Examples 9 to 16 and Comparative Examples 9 to 16 are summarized in Tables 4 and 5.

TABLE 4-1

| | | Composition (mol %) | | | | | Polymer A/ Polymer B ratio | Polymer No |
|---|---|---|---|---|---|---|---|---|
| Example 9 | Polymer A (Monomer 1) | | DM 4.0 | | | SMS 0.5 | | M-9 |
| | Monomer 2 | AM 94.40 | | | MBA 0.10 | SMS 1.0 | | |
| | Polymer B | AM 94.40 | DM 4.0 | | MBA 0.10 | SMS 1.5 | 0.045 | |
| Example 10 | Polymer A (Monomer 1) | | DM 12.0 | | | SMS 0.5 | | M-10 |
| | Monomer 2 | AM 85.30 | | | MBA 0.20 | SMS 2.0 | | |
| | Polymer B | AM 85.30 | DM 12.0 | | MBA 0.20 | SMS 2.5 | 0.125 | |
| Example 11 | Polymer A (Monomer 1) | | DM 6.0 | IA 2.0 | | SMS 1.0 | | M-11 |
| | Monomer 2 | AM 88.85 | | | MBA 0.15 | SMS 2.0 | | |
| | Polymer B | AM 88.85 | DM 6.0 | IA 2.0 | MBA 0.15 | SMS 3.0 | 0.090 | |
| Example 12 | Polymer A (Monomer 1) | | DM 12.0 | IA 2.0 | | SMS 1.0 | | M-12 |
| | Monomer 2 | AM 82.80 | | | MBA 0.20 | SMS 2.0 | | |
| | Polymer B | AM 82.80 | DM 12.0 | IA 2.0 | MBA 0.20 | SMS 3.0 | 0.150 | |
| Example 13 | Polymer A (Monomer 1) | AM 10.00 | DM 8.0 | IA 1.0 | | SMS 1.0 | | M-13 |
| | Monomer 2 | AM 78.35 | | | MBA 0.15 | SMS 1.5 | | |
| | Polymer B | AM 88.35 | DM 8.0 | IA 1.0 | MVA 0.15 | SMS 2.5 | 0.200 | |
| Example 14 | Polymer A (Monomer 1) | AM 15.00 | DM 15.0 | IA 4.0 | | SMS 2.0 | | M-14 |
| | Monomer 2 | AM 60.60 | | | MBA 0.40 | SMS 3.0 | | |
| | Polymer B | AM 75.60 | DM 15.0 | IA 4.0 | MBA 0.40 | SMS 5.0 | 0.360 | |
| Example 15 | Polymer A (Monomer 1) | AM 20.00 | DM 5.0 | IA 1.0 | | DMD 1.0 | | M-15 |
| | Monomer 2 | AM 67.35 | | IA 3.5 | MBA 0.15 | SMS 2.0 | | |
| | Polymer B | AM 87.35 | DM 5.0 | IA 4.5 | MBA 0.15 | SMS 3.0 | 0.270 | |
| Example 16 | Polymer A (Monomer 1) | AM 13.00 | DM 10.0 | IA 1.0 | | SMS 2.0 | | M-16 |
| | Monomer 2 | AM 67.80 | | IA 3.0 | MBA 0.20 | SMS 3.0 | | |
| | Polymer B | AM 80.80 | DM 10.0 | IA 4.0 | MBA 0.20 | SMS 5.0 | 0.260 | |

AM: acrylamide, IA: itaconic acid, MBA: methylene bisacrylamide DM: N,N-dimethylaminoethyl methacrylate, SMS: sodium methallylsulfonate

TABLE 4-2

| | Polymer B Composition (mol %) | | | | | Polymer A/ Polymer ratio | No. |
|---|---|---|---|---|---|---|---|
| Comp. Example 9 | AM 94.40 | DM 4.0 | | MBA 0.10 | SMS 1.5 | — | N-9 |
| Comp. Example 10 | AM 85.30 | DM 12.0 | | MBA 0.20 | SMS 2.5 | — | N-10 |
| Comp. Example 11 | AM 88.85 | DM 6.0 | IA 2.0 | MBA 0.15 | SMS 3.0 | — | N-11 |
| Comp. Example 12 | AM 82.80 | DM 12.0 | IA 2.0 | MBA 0.20 | SMS 3.0 | — | N-12 |
| Comp. Example 13 | AM 88.35 | DM 8.0 | IA 1.0 | MBA 0.15 | SMS 2.5 | — | N-13 |
| Comp. Example 14 | AM 75.60 | DM 15.0 | IA 4.0 | MBA 0.40 | SMS 5.0 | — | N-14 |

TABLE 4-2-continued

| | Polymer B Composition (mol %) | | | | Polymer A/Polymer ratio | No. |
|---|---|---|---|---|---|---|
| Comp. Example 15 | AM 87.35 | DM 5.0 | IA 4.5 | MBA 0.15 SMS 3.0 | — | N-15 |
| Comp. Example 16 | AM 80.80 | DM 10.0 | IA 4.0 | MBA 0.20 SMS 5.0 | — | N-16 |

AM: acrylamide, IA: itaconic acid, MBA: methylene bisacrylamide DM: N,N-dimethylaminoethyl methacrylate, SMS: sodium methallylsulfonate

TABLE 5

| Polymer No. | Viscosity (ps/25° C.) | Molecular Weight ($10^4$) |
|---|---|---|
| M-9 | 51.7 | 246 |
| M-10 | 60.2 | 346 |
| M-11 | 38.3 | 236 |
| M-12 | 56.2 | 344 |
| M-13 | 58.0 | 294 |
| M-14 | 80.9 | 392 |
| M-15 | 41.0 | 309 |
| M-16 | 36.7 | 377 |
| N-9 | 93.9 | 62.9 |
| N-10 | 119.0 | 77.5 |
| N-11 | 78.5 | 97.4 |
| N-12 | 103.0 | 91.3 |
| N-13 | 92.5 | 90.4 |
| N-14 | 117.0 | 71.2 |
| N-15 | 77.1 | 90.3 |
| N-16 | 72.3 | 171 |

Application Examples will be described, in which the polymers from Examples 9 to 16 and Comparative Examples 9 to 16 were used as an internal paper strength agent.

Application Examples 9 to 16 and Comparative Application Examples 9 to 16

To a 1% slurry with a CSF of 355 obtained from waste corrugated papers was added aluminum sulfate in an amount of 1% to the pulp, and then the mixture was stirred for 3 min. The pH of the pulp slurry was 6.0. A 1% aqueous solution of the polymer M-9 was added in an amount of 0.5% to the pulp on nonvolatile-component basis with stirring, and the mixture was further stirred for 3 min. Then, the freeness of the resulting pulp slurry was determined(JIS-P8121) and it was used to make a paper with a TAPPI standard (square) sheet machine. The wet sheet thus made was dried in a drum dryer at 110° C. for 3 min, to give a hand-made paper with a basis weight of 100 g/m². The dried paper was subject to humidity control in an air-conditioned chamber at 20° C. and RH 65% for at least 24 hours, and its burst index(JIS-P8112) and Z-axis directional strength(Internal Bond Tester; Kumagaya Riki Kogyo) were determined. The polymers M-10 to M-16 and N-9 to N-16 were processed and evaluated as described above. The results are shown in Table 6.

TABLE 6

| | Polymer No. | Freeness | Burst index | Z-directional strength (kg.cm) |
|---|---|---|---|---|
| Appl. Example 9 | M-9 | 422 | 4.71 | 4.48 |
| Appl. Example 10 | M-10 | 435 | 4.75 | 4.78 |
| Appl. Example 11 | M-11 | 451 | 4.67 | 4.54 |
| Appl. Example 12 | M-12 | 449 | 4.72 | 4.65 |
| Appl. Example 13 | M-13 | 453 | 4.83 | 4.47 |
| Appl. Example 14 | M-14 | 420 | 4.88 | 4.79 |
| Appl. Example 15 | M-15 | 464 | 4.70 | 4.81 |
| Appl. Example 16 | M-16 | 469 | 4.82 | 4.72 |
| Comp.Appl.Ex. 9 | N-9 | 352 | 3.86 | 3.74 |
| Comp.Appl.Ex. 10 | N-10 | 348 | 3.99 | 3.81 |
| Comp.Appl.Ex. 11 | N-11 | 393 | 3.89 | 3.88 |
| Comp.Appl.Ex. 12 | N-12 | 369 | 3.97 | 3.93 |
| Comp.Appl.Ex. 13 | N-13 | 408 | 3.77 | 3.78 |
| Comp.Appl.Ex. 14 | N-14 | 362 | 3.94 | 3.93 |
| Comp.Appl.Ex. 15 | N-15 | 375 | 3.91 | 3.87 |
| Comp.Appl.Ex. 16 | N-16 | 402 | 3.98 | 3.99 |
| | None | 359 | 3.68 | 3.52 |

EXAMPLE 17

In the above reaction vessel was placed 373.48 g of purified water, and then the internal temperature was adjusted to 80° C. while introducing nitrogen gas.

A solution of 307.51 g of 50% acrylamide, 170.84 g of 70% methacryloyloxyethyl-dimethyl-benzylammonium chloride, 7.31 g of itaconic acid and 8.89 g of sodium methallylsulfonate whose pH was adjusted to 3.5 with 35% HCl and an aqueous solution(60 g) of 0.49 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours and then 0.4 g of hydroquinone was added, to provide a polymer, which is designated as m-17.

All the amount of m-17 was added into the above reaction vessel, whose internal temperature was then adjusted to 80° C. while introducing nitrogen gas. A solution of 2.17 g of methylene bisacrylamide, 7.59 g of 80% acrylic acid and 2.22 g of sodium methallylsulfonate whose pH was adjusted to 3.5 with 35% HCl and an aqueous solution(60 g) of 0.09 g of 4,4'-azobis-4-cyanovaleric acid(purity: 84%) were prepared and simultaneously added dropwise at constant rates into the reaction vessel over 10 min, maintaining the internal temperature at 80° C. After addition, polymerization was continued at 80° C. for 3 hours, to provide a polymer B. While cooling the polymer solution the proportion of the nonvolatile component was adjusted by adding water, to give an aqueous solution of an amphoteric polymer containing 30% of the nonvolatile component with a Brookfield viscosity of 15400 cps at 25° C. The polymer is designated as M-17.

The weight-average molecular weight of M-17 by GPC-MALLS was 6,500,000.

EXAMPLE 18

In the above reaction vessel was placed 158.10 g of purified water, and then the internal temperature was adjusted to 80° C. while introducing nitrogen gas.

A solution of 385.67 g of 50% acrylamide, 191.34 g of 75% acryloyloxyethyl-dimethyl-benzylammonium chloride, 64.39 g of 80% acryloyloxyethyl-trimethylammonium chloride, 13.84 g of itaconic acid and 16.82 g of sodium methallylsulfonate whose pH was adjusted to 4.2 with 35% HCl and an aqueous solution(72 g) of 0.59 g of 4,4'-azobis-4-cyanovaleric acid(purity: 84%) were prepared, and simultaneously added dropwise at constant rates into the reaction vessel over 200 min, maintaining the internal temperature at 80° C. After addition, polymerization was continued at 80° C. for 3 hours. Methanol was added to provide a precipitate, which was then dried to give a polymer designated as m-18.

In the above reaction vessel was placed 403.03g of purified water and 174.63 g of the dried polymer m-18 and the solution was adjusted to pH 4.2 with 35% HCl and then internal temperature was adjusted to 80° C. while introducing nitrogen gas.

A solution of 174.63 g of the polymer m-18, 173.93 g of 50% acrylamide, 2.73 g of methylene bisacrylamide, 11.53 g of itaconic acid and 0.10 g of sodium hypophosphite whose pH was adjusted to 4.2 with 35% HCl and an aqueous solution(60 g) of 0.17 g of 4,4'-azobis-4-cyanovaleric acid (purity: 84%) were prepared and simultaneously added dropwise at constant rates into the reaction vessel over 180 min, maintaining the internal temperature at 80° C. After addition, polymerization was continued at 80° C. for 3 hours, to provide a polymer B. While cooling the polymer solution the proportion of the nonvolatile component was adjusted by adding water, to give an aqueous solution of an amphoteric polymer containing 45% of the nonvolatile component with a Brookfield viscosity of 13640 cps at 25° C. The polymer is designated as M-18.

The weight-average molecular weight of M-18 by GPC-MALLS was 5,910,000.

EXAMPLE 19

In the above reaction vessel was placed 613.73 g of purified water, and then the internal temperature was adjusted to 80° C. while introducing nitrogen gas.

A solution of 93.52 g of 50% acrylamide, 71.53 g of 60% methacryloyloxyethyl-dimethyl-benzylammonium chloride, 11.81 g of N,N-dimethylaminopropylacrylamide and 3.59 g of sodium methallylsulfonate whose pH was adjusted to 4.2 with 35% HCl and an aqueous solution(60 g) of 0.49 g of 4,4'-azobis-4-cyanovaleric acid(purity: 84%) were prepared, and simultaneously added dropwise at constant rates into the reaction vessel over 180 min, maintaining the internal temperature at 80° C. After addition, polymerization was continued at 80° C. for 3 hours, 0.4 g of hydroquinone was added and the mixture was cooled to provide an aqueous solution of a polymer designated as m-19.

In a Dewar vessel was placed all the aqueous solution of the polymer m-19, 81.80 g of 50% acrylamide, 2.95 g of itaconic acid, 0.12 g of methylene bisacrylamide, and 0.96 g of sodium hypophosphite, and the solution was adjusted to pH 4.2 with 35% HCl and heated to 65° C. An aqueous solution(30 g) of 0.13 g of ammonium persulfate and an aqueous solution(30 g) of 0.08 g of sodium hydrogensulfite were prepared and separately added into the Dewar vessel. The polymer solution was heated to 80° C. and then the internal temperature was kept at 80° C. for 4 hours. While cooling the polymer solution the proportion of the nonvolatile component was adjusted by adding water, to give an aqueous solution of an amphoteric polymer containing 15% of the nonvolatile component with a Brookfield viscosity of 18730 cps at 25° C. The polymer is designated as M-19.

The weight-average molecular weight of M-19 by GPC-MALLS was 6,930,000.

EXAMPLE 20

In the above reaction vessel was placed 375.81 g of purified water, and then the internal temperature was adjusted to 80° C. while introducing nitrogen gas.

A solution of 144.04 g of 50% acrylamide, 72.61 g of 60% methacryloyloxyethyl-dimethyl-benzylammonium chloride, 39.86 g of 80% methacryloyloxyethyl-trimethylammonium chloride, 21.98 g of N,N-dimethylaminoethyl acrylate and 9.71 g of sodium methallylsulfonate whose pH was adjusted to 4.5 with 35% HCl and an aqueous solution(60 g) of 0.49 g of 4,4'-azobis-4-cyanovaleric acid(purity: 84%) were prepared, and simultaneously added dropwise at constant rates into the reaction vessel over 120 min, maintaining the internal temperature at 80° C. After addition, polymerization was continued at 80° C. for 3 hours, to give a polymer designated as m-20.

A solution of 190.30 g of 50% acrylamide, 7.99 g of itaconic acid, 1.89 g of methylene bisacrylamide, 6.09 g of N,N-dimethylacrylamide and 9.71 g of sodium methallylsulfonate whose pH was adjusted to 4.5 with 35% HCl and an aqueous solution(60 g) of 0.49 g of 4,4'-azobis-4-cyanovaleric acid(purity: 84%) were prepared and simultaneously added dropwise at constant rates into the reaction vessel over 120 min, maintaining the internal temperature at 90° C. After addition, polymerization was continued at 90° C. for 3 hours, to provide a polymer B. While cooling the polymer solution the proportion of the nonvolatile component was adjusted by adding water, to give an aqueous solution of an amphoteric polymer containing 30% of the nonvolatile component with a Brookfield viscosity of 3040 cps at 25° C. The polymer is designated as M-20.

The weight-average molecular weight of M-20 by GPC-MALLS was 3,110,000.

Comparative Example 17

In the above reaction vessel was placed 373.48 g of purified water, and then the internal temperature was adjusted to 80° C. while introducing nitrogen gas.

A solution of 307.51 g of 50% acrylamide, 170.84 g of 70% methacryloyloxyethyl-dimethyl-benzylammonium chloride, 7.59 g of 80% acrylic acid, 7.31 g of itaconic acid, 2.17 g of methylene bisacrylamide and 11.11 g of sodium methallylsulfonate whose pH was adjusted to 3.5 with 35% HCl and an aqueous solution(120 g) of 0.49 g of 4,4'-azobis-4-cyanovaleric acid(purity: 84%) were prepared, and simultaneously added dropwise at constant rates into the reaction vessel over 300 min, maintaining the internal temperature at 80° C. After addition, polymerization was continued at 80° C. for 4 hours. While cooling the polymer solution the proportion of the nonvolatile component was adjusted by adding water, to give an aqueous solution of an amphoteric polymer containing 30% of the nonvolatile component with a Brookfield viscosity of 18180 cps at 25° C. The polymer is designated as N-17.

The weight-average molecular weight of N-17 by GPC-MALLS was 2,950,000.

Comparative Example 18

In the above reaction vessel was placed 131.75 g of purified water, and then the internal temperature was adjusted to 80° C. while introducing nitrogen gas.

A solution of 495.32 g of 50% acrylamide, 159.45 g of 75% acryloyloxyethyl-dimethyl-benzylammonium chloride, 53.66 g of 80% acryloyloxyethyl-trimethylammonium chloride, 23.07 g of itaconic acid, 2.73 g of methylene bisacrylamide, 14.02 g of sodium methallylsulfonate and 0.10 g of sodium hypophosphite whose pH was adjusted to 4.2 with 35% HCl and an aqueous solution(120 g) of 0.49 g of 4,4'-azobis-4-cyanovaleric acid(purity: 84%) were prepared, and simultaneously added dropwise at constant rates into the reaction vessel over 380 min, maintaining the internal temperature at 80° C. After addition, polymerization was continued at 80° C. for 5 hours. While cooling the polymer solution the proportion of the nonvolatile component was adjusted by adding water, to give an aqueous solution of an amphoteric polymer containing 45% of the nonvolatile component with a Brookfield viscosity of 18690 cps at 25° C. The polymer is designated as N-18.

The weight-average molecular weight of N-18 by GPC-MALLS was 2,840,000.

Comparative Example 19

In the above reaction vessel was placed 613.73 g of purified water, and then the internal temperature was adjusted to 80° C. while introducing nitrogen gas.

A solution of 175.32 g of 50% acrylamide, 71.53 g of 60% methacryloyloxyethyl-dimethyl-benzylammonium chloride, 11.81 g of N,N-dimethylaminopropylacrylamide, 2.95 g of itaconic acid, 0.12 g of methylene bisacrylamide and 4.54 g of sodium methallylsulfonate whose pH was adjusted to 4.2 with 35% HCl and an aqueous solution(120 g) of 0.49 g of 4,4'-azobis-4-cyanovaleric acid(purity: 84%) were prepared, and simultaneously added dropwise at constant rates into the reaction vessel over 360 min, maintaining the internal temperature at 80° C. After addition, polymerization was continued at 80° C. for 4 hours. While cooling the polymer solution the proportion of the nonvolatile component was adjusted by adding water, to give an aqueous solution of an amphoteric polymer containing 15% of the nonvolatile component with a Brookfield viscosity of 15050 cps at 25° C. The polymer is designated as N-19.

The weight-average molecular weight of N-19 by GPC-MALLS was 2,530,000.

Comparative Example 20

In the above reaction vessel was placed 375.81 g of purified water, and then the internal temperature was adjusted to 80° C. while introducing nitrogen gas.

A solution of 334.34 g of 50% acrylamide, 72.61 g of 60% methacryloyloxyethyl-dimethyl-benzylammonium chloride, 39.86 g of 80% methacryloyloxyethyl-trimethylammonium chloride, 21.98 g of N,N-dimethylaminoethyl acrylate, 6.09 g of N,N-dimethylacrylamide, 7.99 g of itaconic acid, 1.89 g of methylene bisacrylamide and 19.42 g of sodium methallylsulfonate whose pH was adjusted to 4.5 with 35% HCl and an aqueous solution(120 g) of 0.49 g of 4,4'-azobis-4-cyanovaleric acid(purity: 84%) were prepared, and simultaneously added dropwise at constant rates into the reaction vessel over 240 min, maintaining the internal temperature at 80° C. After addition, polymerization was continued at 80° C. for 4 hours. While cooling the polymer solution the proportion of the nonvolatile component was adjusted by adding water, to give an aqueous solution of an amphoteric polymer containing 30% of the nonvolatile component with a Brookfield viscosity of 3560 cps at 25° C. The polymer is designated as N-20.

The weight-average molecular weight of N-20 by GPC-MALLS was 1,320,000.

The compositions and the physical properties of the polymers from Examples 17 to 20 and Comparative Examples 17 to 20 are summarized in Tables 7 and 8.

TABLE 7-1

| | | Composition (mol %) | | | | | | Polymer A/Polymer B ratio | Polymer No. |
|---|---|---|---|---|---|---|---|---|---|
| Example 17 | Polymer A (Monomer 1) | AM 77.0 | DMBq 15.0 | IA 2.0 | | | SMS 2.0 | | M-17 |
| | Monomer 2 | | AA 3.0 | | | MBA 0.50 | SMS 0.5 | | |
| | Polymer B | AM 77.0 MBA 0.50 | DMBq 15.0 SMS 2.5 | IA 2.0 | AA 3.0 | | | 0.960 | |
| Example 18 | Polymer A (Monomer 1) | AM 51.0 | DABq 10.0 | DAq 5.0 | IA 2.0 | | SMS 2.0 | | M-18 |
| | Monomer 2 | AM 27.6 | IA 2.0 | | | MBA 0.40 | | | |
| | Polymer B | AM 78.6 MBA 0.40 | DABq 10.0 SMS 2.0 | DAq 5.0 | IA 4.0 | | | 0.700 | |
| Example 19 | Polymer A (Monomer 1) | AM 43.50 | DMBq 10.0 | DMAPA 5.0 | | | SMS 1.5 | | M-19 |
| | Monomer 2 | AM 38.05 | IA 1.5 | | | MBA 0.05 | SMS 0.4 | | |
| | Polymer B | AM 81.55 MBA 0.05 | DMBq 10.0 SMS 1.9 | DMAPA 5.0 | IA 1.5 | | | 0.600 | |
| Example 20 | Polymer A (Monomer 1) | AM 33.0 | DMBq 5.0 | DMq 5.0 | DA 5.0 | | SMS 2.0 | | M-20 |
| | Monomer 2 | AM 43.6 | DMAA 2.0 | IA 2.0 | | MBA 0.40 | SMS 2.0 | | |
| | Polymer B | AM 76.6 MBA 0.40 | DMBq 5.0 DMAA 2.0 | DMq 5.0 IA 2.0 | DA 5.0 SMS 4.0 | | | 0.500 | |

AM: acrylamide, AA: acrylic acid, IA: itaconic acid, MBA: methylene bisacrylamide
SMS: sodium methallylsulfonate, DMAA: N,N,-dimethylacrylamide
DMBq: methacrloyloxyethyl-dimethyl-benzylammonium chloride
DABq: acryloyloxyethyl-dimethyl-benzylammonium chloride
DMq: methacryloyloxyethyl-trimethylammonium chloride
DAq: acryloyloxyethyl-trimethylammonium chloride
DA: N,N-dimethylaminoethyl acrylate
DMAPA: N,N-dimethylaminopropyl acrylamide

TABLE 7-2

| | Composition (mol %) | | | | Polymer A/Polymer B ratio | Polymer No. |
|---|---|---|---|---|---|---|
| Comp. Example 17 | AM 77.0 MBA 0.50 | MDBq 15.0 SMS 2.5 | IA 2.0 | AA 3.0 | — | N-17 |
| Comp. Example 18 | AM 78.6 MBA 0.40 | DABq 10.0 SMS 2.0 | DAq 5.0 | IA 4.0 | — | N-18 |
| Comp. Example 19 | AM 81.55 MBA 0.05 | DMBq 10.0 SMS 1.9 | DMAPA 2.0 | IA 1.5 | — | N-19 |
| Comp. Example 20 | AM 76.6 MBA 0.40 | DMBq 5.0 DMAA 2.0 | DMq 5.0 IA 2.0 | DA 5.0 SMS 4.0 | — | N-20 |

AM: acrylamide, AA: acrylic acid, IA: itaconic acid, MBA: methylene bisacrylamide
SMS: sodium methallylsulfonate, DMAA: N,N,-dimethylacrylamide
DMBq: methacrloyloxyethyl-dimethyl-benzylammonium chloride
DABq: acryloyloxyethyl-dimethyl-benzylammonium chloride
DMq: methacryloyloxyethyl-trimethylammonium chloride
DAq: acryloyloxyethyl-trimethylammonium chloride
DA: N,N-dimethylaminoethyl acrylate
DMAPA: N,N-dimethylaminopropyl acrylamide

TABLE 8

| Polymer No. | Viscosity (ps/25° C.) | Concentration (%) | Molecular Weight ($10^4$) |
|---|---|---|---|
| M-17 | 154.0 | 30.0 | 650 |
| M-18 | 136.4 | 45.0 | 591 |
| M-19 | 187.3 | 15.0 | 693 |
| M-20 | 30.4 | 30.0 | 311 |
| N-17 | 181.8 | 30.0 | 295 |
| N-18 | 186.9 | 45.0 | 284 |
| N-19 | 150.5 | 15.0 | 253 |
| N-20 | 35.6 | 30.0 | 132 |

Application Examples will be described, in which the polymers from Examples 17 to 20 and Comparative Examples 17 to 20 were used as an internal paper strength agent.

Application Examples 17 to 20 and Comparative Application Examples 17 to 20

To a stirred 1% slurry, pH 7.5, with a CSF of 222 obtained from waste corrugated papers was added a 1% aqueous solution of the polymer M-17 in an amount of 0.5% to the pulp, and then the mixture was stirred for 3 min. Then, the freeness of the resulting pulp slurry was determined(JIS-P8121) and it was used to make a paper with a TAPPI standard (square) sheet machine. The wet sheet thus made was dried in a drum dryer at 110° C. for 3 min, to give a hand-made paper with a basis weight of 140 g/m². The dried paper was subject to humidity control in an air-conditioned chamber at 20° C. and RH 65% for at least 24 hours, and its burst index(JIS-P8112) and Z-axis directional strength (Internal Bond Tester; Kumagaya Riki Kogyo) were determined. The polymers M-18 to M-20 and N-17 to N-20 were processed and evaluated as described above. The results are shown in Table 9.

TABLE 9

(Papermaking pH 7.5)

| | Polymer No. | Freeness | Burst index | Z-directional strength (kg · cm) |
|---|---|---|---|---|
| Appl. Example 17 | M-17 | 242 | 3.71 | 4.88 |
| Appl. Example 18 | M-18 | 255 | 3.75 | 4.78 |
| Appl. Example 19 | M-19 | 251 | 3.67 | 5.09 |
| Appl. Example 20 | M-20 | 249 | 3.72 | 4.75 |

TABLE 9-continued (Papermaking pH 7.5)

| | Polymer No. | Freeness | Burst index | Z-directional strength (kg · cm) |
|---|---|---|---|---|
| Comp. Appl. Ex. 17 | N-17 | 232 | 2.86 | 3.98 |
| Comp. Appl. Ex. 18 | N-18 | 228 | 2.99 | 3.87 |
| Comp. Appl. Ex. 19 | N-19 | 233 | 2.89 | 3.80 |
| Comp. Appl. Ex. 20 | N-20 | 219 | 2.97 | 3.90 |
| | None | 222 | 2.50 | 3.62 |

EXAMPLE 21

In the above reaction vessel was placed 257.05 g of purified water, and then the internal temperature was adjusted to 80° C. while introducing nitrogen gas.

A solution of 307.38 g of 80% acryloyloxyethyl-trimethylammonium chloride and 4.10 g of sodium methallylsulfonate whose pH was adjusted to 4.2 with 35% HCl and an aqueous solution(60 g) of 0.98 g of 4,4'-azobis-4-cyanovaleric acid(purity: 84%) were prepared, and simultaneously added dropwise at constant rates into the reaction vessel over 180 min, maintaining the internal temperature at 80° C. After addition, polymerization was continued at 80° C. for 3 hours, to give a polymer designated as m-21.

A solution of 307.38 g of 80% acryloyloxyethyl-trimethylammonium chloride and 4.10 g of sodium methallylsulfonate whose pH was adjusted to 4.2 with 35% HCl and an aqueous solution(60 g) of 0.98 g of 4,4'-azobis-4-cyanovaleric acid(purity: 84%) were prepared and simultaneously added dropwise at constant rates into the reaction vessel over 180 min, maintaining the internal temperature at 80° C. After addition, polymerization was continued at 80° C. for 3 hours, to provide a polymer B. While cooling the polymer solution the proportion of the nonvolatile component was adjusted by adding water, to give an aqueous solution of a polymer containing 50% of the nonvolatile component with a Brookfield viscosity of 7600 cps at 25° C. The polymer is designated as M-21.

Comparative Example 21

In the above reaction vessel was placed 257.05 g of purified water, and then the internal temperature was adjusted to 80° C. while introducing nitrogen gas.

A solution of 614.75 g of 80% acryloyloxyethyl-trimethylammonium chloride and 8.20 g of sodium methallylsulfonate whose pH was adjusted to 4.5 with 35% HCl and an aqueous solution(120 g) of 0.98 g of 4,4'-azobis-4-cyanovaleric acid(purity: 84%) were prepared, and simultaneously added dropwise at constant rates into the reaction vessel over 360 min, maintaining the internal temperature at 80° C. After addition, polymerization was continued at 80° C. for 4 hours to give a polymer B. While cooling the polymer solution the proportion of the nonvolatile component was adjusted by adding water, to give an aqueous solution of an amphoteric polymer containing 50% of the nonvolatile component with a Brookfield viscosity of 8050 cps at 25° C. The polymer is designated as N-21.

The compositions and the physical properties of the polymers from example 21 and Comparative example 21 are summarized in Tables 10 and 11.

TABLE 10-1

|  |  | Composition (mol %) |  |  |  | Polymer A/Polymer B ratio | Polymer No. |
|---|---|---|---|---|---|---|---|
| Example 21 | Polymer A (Monomer 1) | DAq | 49.0 | SMS | 1.0 |  | M-21 |
|  | Monomer 2 | DAq | 49.0 | SMS | 1.0 |  |  |
|  | Polymer B | DAq | 98.0 | SMS | 2.0 | 0.500 |  |

SMS: sodium methallylsulfonate
DAq: acryloyloxyethyl-trimethylammonium chloride

TABLE 10-2

|  | Composition (mol %) |  |  |  | Polymer A/Polymer B ratio | Polymer No. |
|---|---|---|---|---|---|---|
| Comp. Example 21 | DAq | 98.0 | SMS | 2.0 | — | N-21 |

TABLE 11

| Polymer No. | Viscosity (ps/25° C.) | Concentration (%) |
|---|---|---|
| M-21 | 76.0 | 50.0 |
| N-21 | 80.5 | 50.0 |

Application Example 21 and Comparative Application Example 21

To a stirred 1% slurry with a CSF of 376 obtained from waste corrugated papers was added aluminum sulfate in an amount of 1.0% to the pulp, and the mixture was stirred for 3 min. The pH of the pulp slurry was 5.5. A 1% aqueous solution of the polymer M-21 was added with stirring in an amount of 0.05% to the pulp on nonvolatile-component basis, and then the mixture was stirred for 3 min. Then, the freeness of the resulting pulp slurry was determined(JIS-P8121) and it was used to make a paper with a TAPPI standard (square) sheet machine. The wet sheet thus made was dried in a drum dryer at 110° C. for 3 min, to give a hand-made paper with a basis weight of 120 g/m². The dried paper was subject to humidity control in an air-conditioned chamber at 20° C. and RH 65% for at least 24 hours, and its burst index(JIS-P8112) and Z-axis directional strength (Internal Bond Tester; Kumagaya Riki Kogyo) were deter mined. The polymer N-21 was processed and evaluated as described above. The results are shown in Table 12.

TABLE 12

(Papermaking pH 5.5)

|  | Polymer No. | Freeness | Burst index | Z-directional strength (kg · cm) |
|---|---|---|---|---|
| Appl. Example 21 | M-21 | 552 | 2.47 | 1.74 |
| Comp. Appl. Ex. 21 | N-21 | 435 | 2.00 | 1.43 |
|  | None | 376 | 2.00 | 1.39 |

The measuring conditions for GPC-MALLS in the Examples and the Comparative Examples below are as follows GPC body: System 21, Showa Denko K.K.;
Column: SHODEX OHpak SB-806MHQ;
Eluent: a N/15 phosphate buffer(pH 7) containing N/10 sodium nitrate;
Flow rate: 1.0 mL/min;
Detector: a multi-angle light scattering detector DAWN, Wyatt Technology Company.

EXAMPLE 22

In a five-necked flask equipped with an agitator, a reflux condenser, a thermometer, a nitrogen-inlet tube and a dropping inlet (hereinafter, referred to as a "reaction vessel") was placed 184 g of ion exchanged water, and after replacing the atmosphere with nitrogen, the internal temperature was adjusted to 80° C. with a heater(waterbath).

A solution of 22.0 g of 80% acrylic acid, 9.88 g of sodium methallylsulfonate and 231 g of 50% acrylamide whose pH was adjusted to 4.5 with 20% sodium hydroxide and an aqueous solution(52 g) of 0.408 g of potassium persulfate were prepared, and simultaneously added dropwise at constant rates into the reaction vessel over 30 min, maintaining the internal temperature at 80° C. After addition, polymerization was continued at 80° C. for 1 hour, to provide a polymer A.

Subsequently a solution of 299 g of 50% acrylamide, 0.627 g of methylene bisacrylamide and 4.5 g of sodium methallylsulfonate and an aqueous solution(100 g) of 0.112 g of potassium persulfate were prepared and simultaneously added dropwise at constant rates into the reaction vessel over 120 min, maintaining the internal temperature at 80° C. After addition, polymerization was continued at 80° C. for 2 hours, to provide a polymer B. While cooling the polymer solution the proportion of the nonvolatile component was adjusted by adding water, to give an aqueous solution of an anionic acrylamide polymer containing 30% of the nonvolatile component with a Brookfield viscosity of 3600 mPa·s at 25° C. The polymer is designated as P-1.

The weight-average molecular weight of P-1 by GPC-MALLS was 860,000.

EXAMPLE 23

In the reaction vessel was placed 178 g of ion exchanged water, and after replacing the atmosphere with nitrogen, the internal temperature was adjusted to 80° C. with a heater (waterbath).

A solution of 17.6 g of 80% acrylic acid, 12.3 g of sodium methallylsulfonate and 370 g of 50% acrylamide whose pH was adjusted to 4.5 with 20% sodium hydroxide and an aqueous solution(80 g) of 0.3 g of potassium persulfate were prepared, and simultaneously added dropwise at constant rates into the reaction vessel over 120 min, maintaining the internal temperature at 80° C. After addition, polymerization was continued at 80° C. for 1 hour, to provide a polymer A.

Subsequently a solution of 53 g of 50% acrylamide and 0.501 g of methylene bisacrylamide and an aqueous solution (41 g) of 0.14 g of potassium persulfate were prepared and simultaneously added dropwise at constant rates into the reaction vessel over 30 min, maintaining the internal temperature at 80° C. After addition, polymerization was continued at 80° C. for 2 hours, to provide a polymer B. While cooling the polymer solution the proportion of the nonvolatile component was adjusted by adding water, to give an aqueous solution of an anionic acrylamide polymer containing 30% of the nonvolatile component with a Brookfield viscosity of 8100 mpa·s at 25° C. The polymer is designated as P-2.

The weight-average molecular weight of P-2 by GPC-MALLS was 3,710,000.

EXAMPLE 24

In the reaction vessel was placed 175 g of ion exchanged water, and after replacing the atmosphere with nitrogen, the internal temperature was adjusted to 80° C. with a heater (waterbath).

A solution of 8.77 g of 80% acrylic acid, 13.9 g of sodium methallylsulfonate and 369 g of 50% acrylamide whose pH was adjusted to 4.5 with 20% sodium hydroxide and an aqueous solution(80 g) of 0.3 g of potassium persulfate were prepared, and simultaneously added dropwise at constant rates into the reaction vessel over 120 min, maintaining the internal temperature at 80° C. After addition, polymerization was continued at 80° C. for 1 hour, to provide a polymer A.

Subsequently a solution of 65.5 g of 50% acrylamide and 0.5 g of methylene bisacrylamide and an aqueous solution (41 g) of 0.14 g of potassium persulfate were prepared and simultaneously added dropwise at constant rates into the reaction vessel over 30 min, maintaining the internal temperature at 80° C. After addition, polymerization was continued at 80° C. for 2 hours, to provide a polymer B. While cooling the polymer solution the proportion of the nonvolatile component was adjusted by adding water, to give an aqueous solution of an anionic acrylamide polymer containing 30% of the nonvolatile component with a Brookfield viscosity of 5900 mPa·s at 25° C. The polymer is designated as P-3.

The weight-average molecular weight of P-3 by GPC-MALLS was 3,230,000.

EXAMPLE 25

In the reaction vessel was placed 184 g of ion exchanged water, and after replacing the atmosphere with nitrogen, the internal temperature was adjusted to 80° C. with a heater (waterbath).

A solution of 35.1 g of 80% acrylic acid, 10.6 g of sodium methallylsulfonate and 369 g of 50% acrylamide whose pH was adjusted to 4.5 with 20% sodium hydroxide and an aqueous solution(80 g) of 0.3 g of potassium persulfate were prepared, and simultaneously added dropwise at constant rates into the reaction vessel over 120 min, maintaining the internal temperature at 80° C. After addition, polymerization was continued at 80° C. for 1 hour, to provide a polymer A.

Subsequently a solution of 26.9 g of 50% acrylamide and 0.501 g of methylene bisacrylamide and an aqueous solution (41 g) of 0.14 g of potassium persulfate were prepared and simultaneously added dropwise at constant rates into the reaction vessel over 30 min, maintaining the internal temperature at 80° C. After addition, polymerization was continued at 80° C. for 2 hours, to provide a polymer B. While cooling the polymer solution the proportion of the nonvolatile component was adjusted by adding water, to give an aqueous solution of an anionic acrylamide polymer containing 30% of the nonvolatile component with a Brookfield viscosity of 5000 mPa·s at 25° C. The polymer is designated as P-4.

The weight-average molecular weight of P-4 by GPC-MALLS was 1,560,000.

EXAMPLE 26

In the reaction vessel was placed 186 g of ion exchanged water, and after replacing the atmosphere with nitrogen, the internal temperature was adjusted to 80° C. with a heater (waterbath).

A solution of 23.5 g of itaconic acid, 7.84 g of sodium methallylsulfonate and 256 g of 50% acrylamide whose pH was adjusted to 6 with 40% sodium hydroxide and an aqueous solution(41 g) of 0.2 g of potassium persulfate were prepared, and simultaneously added dropwise at constant rates into the reaction vessel over 60 min, maintaining the internal temperature at 80° C. After addition, polymerization was continued at 80° C. for 1 hour, to provide a polymer A.

Subsequently a solution of 136 g of 50% acrylamide, 0.463 g of methylene bisacrylamide and 1.54 g of sodium methallylsulfonate and an aqueous solution(80 g) of 0.24 g of potassium persulfate were prepared and simultaneously added dropwise at constant rates into the reaction vessel over 120 min, maintaining the internal temperature at 80° C. After addition, polymerization was continued at 80° C. for 2 hours, to provide a polymer B. While cooling the polymer solution the proportion of the nonvolatile component was adjusted by adding water, to give an aqueous solution of an anionic acrylamide polymer containing 30% of the nonvolatile component with a Brookfield viscosity of 6250 mPa·s at 25° C. The polymer is designated as P-5.

The weight-average molecular weight of P-5 by GPC-MALLS was 5,340,000.

EXAMPLE 27

In the reaction vessel was placed 185 g of ion exchanged water, and after replacing the atmosphere with nitrogen, the internal temperature was adjusted to 80° C. with a heater (waterbath).

A solution of 23.7 g of itaconic acid, 5.52 g of sodium methallylsulfonate and 388 g of 50% acrylamide whose pH was adjusted to 6 with 40% sodium hydroxide and an aqueous solution(80 g) of 0.3 g of potassium persulfate were prepared, and simultaneously added dropwise at constant rates into the reaction vessel over 120 min, maintaining the internal temperature at 80° C. After addition, polymerization was continued at 80° C. for 1 hour, to provide a polymer A.

Subsequently a solution of 3.23 g of 50% acrylamide, 0.468 g of methylene bisacrylamide and 5.46 g of 80% acrylic acid and an aqueous solution(41 g) of 0.14 g of potassium persulfate were prepared and simultaneously added dropwise at constant rates into the reaction vessel over 30 min, maintaining the internal temperature at 80° C. After addition, polymerization was continued at 80° C. for 2 hours, to provide a polymer B. while cooling the polymer solution the proportion of the nonvolatile component was adjusted by adding water, to give an aqueous solution of an anionic acrylamide polymer containing 30% of the nonvolatile component with a Brookfield viscosity of 5420 mPa·s at 25° C. The polymer is designated as P-6.

The weight-average molecular weight of P-6 by GPC-MALLS was 1,230,000.

EXAMPLE 28

In the reaction vessel was placed 178 g of ion exchanged water, and after replacing the atmosphere with nitrogen, the internal temperature was adjusted to 80° C. with a heater (waterbath).

A solution of 12.2 g of itaconic acid, 10.3 g of sodium methallylsulfonate and 356 g of 50% acrylamide whose pH was adjusted to 6 with 40% sodium hydroxide and an aqueous solution(41 g) of 0.24 g of potassium persulfate were prepared, and simultaneously added dropwise at constant rates into the reaction vessel over 60 min, maintaining the internal temperature at 80° C. After addition, polymerization was continued at 80° C. for 1 hour, to provide a polymer A.

Subsequently a solution of 65.7 g of 50% acrylamide, 0.483 g of methylene bisacrylamide and 0.421 g of sodium methallylsulfonate and an aqueous solution(80 g) of 0.2 g of potassium persulfate were prepared and simultaneously added dropwise at constant rates into the reaction vessel over 120 min, maintaining the internal temperature at 80° C. After addition, polymerization was continued at 80° C. for 2 hours, to provide a polymer B. While cooling the polymer solution the proportion of the nonvolatile component was adjusted by adding water, to give an aqueous solution of an anionic acrylamide polymer containing 30% of the nonvolatile component with a Brookfield viscosity of 5250 mPa·s at 25° C. The polymer is designated as P-7.

The weight-average molecular weight of P-7 by GPC-MALLS was 3,620,000.

Comparative Example 22

In the reaction vessel were placed 165 g of ion exchanged water, 76 g of 40% acrylamide, 11.2 g of acrylonitrile and 3.68 g of 80% acrylic acid, and the internal temperature was adjusted to 35° C. with a heater(waterbath). Into the vessel were added 0.456 g of potassium persulfate and after 6 min an aqueous solution(0.75 g) of 0.046 g of sodium hydrogensulfite to initiate a polymerization reaction. Ninety(90) minutes after the initiation of the polymerization, solution (0.56g) of 0.14 g of sodium hydrogensulfite was added, and the mixture was allowed to stand for 30 min. While cooling the polymer solution 25.9 g of water and then 25% sodium hydroxide for pH adjustment were added, and then the proportion of the nonvolatile component were adjusted to 15% by adding water, to give an aqueous solution of an anionic acrylamide polymer with a Brookfield viscosity of 5200 mPa·s at 25° C. The polymer is designated as Q-1.

The weight-average molecular weight of Q-1 by GPC-MALLS was 200,000.

Comparative Example 23

In the reaction vessel were placed 73.9 g of ion exchanged water, and after replacing the atmosphere with nitrogen, the internal temperature was adjusted to 80° C. with a heater (waterbath).

A solution of 7.1 g of 80% acrylic acid, 4.15 g of sodium methallylsulfate, 172 g of 50% acrylamide and 0.182 g of methylene bisacrylamide in 13.6 g of ion exchanged water and an aqueous solution(13.01 g) of 0.096 g of potassium persulfate were prepared and simultaneously added dropwise at constant rates into the reaction vessel over 150 min, maintaining the internal temperature at 80° C. After addition, polymerization was continued at 80° C. for 2 hours. While cooling the polymer solution the proportion of the nonvolatile component were adjusted by adding water, to give an aqueous solution of an anionic acrylamide polymer containing 30% of the nonvolatile component with a Brookfield viscosity of 3500 mPa·s at 25° C. The polymer is designated as Q-2.

The weight-average molecular weight of Q-2 by GPC-MALLS was 1,040,000.

Comparative Example 24

In the reaction vessel were placed 80.5 g of ion exchanged water, and after replacing the atmosphere with nitrogen, the internal temperature was adjusted to 80° C. with a heater (waterbath).

A solution of 4.95 g of itaconic acid, 1.52 g of sodium methallylsulfate, 157 g of 50% acrylamide, 0.137 g of methylene bisacrylamide and 6.74 g of acrylonitrile whose pH was adjusted to 6 with 25% sodium hydroxide and an aqueous solution(31 g) of 1.27 g of potassium persulfate were prepared and simultaneously added dropwise at constant rates into the reaction vessel over 150 min, maintaining the internal temperature at 79° C. After addition, polymerization was continued at 79° C. for 2 hours. While cooling the polymer solution the proportion of the nonvolatile component were adjusted by adding water, to give an aqueous solution of an anionic acrylamide polymer containing 30% of the nonvolatile component with a Brookfield viscosity of 3700 mPa·s at 25° C. The polymer is designated as Q-3.

The weight-average molecular weight of Q-3 by GPC-MALLS was 510,000.

The compositions and the physical properties of Examples 22 to 28 and Comparative Examples 22 to 24 are summarized in Table 13.

TABLE 13

| | | Composition (mol %) | | | Total mol % | Polymer No. | Viscosity mPa · s | Molecular Weight ($10^4$) |
|---|---|---|---|---|---|---|---|---|
| Exam. 22 | Polymer (A) | AA6 | SM1.5 | AM40 | 47.5 | P-1 | 3600 | 86 |
| | Polymer (B)-(A) | AM51.7 | SM0.7 | MB0.1 | 52.5 | | | |
| Exam. 23 | Polymer (A) | AA6 | SM2.4 | AM80 | 88.4 | P-2 | 8100 | 371 |
| | Polymer (B)-(A) | AM11.5 | | MB0.1 | 11.6 | | | |

TABLE 13-continued

| | Composition (mol %) | | | Total mol % | Polymer No. | Viscosity mPa·s | Molecular Weight ($10^4$) |
|---|---|---|---|---|---|---|---|
| Exam. 24 | Polymer (A) AA3<br>Polymer (B)-(A) AM14.2 | SM2.7 | AM80<br>MB0.1 | 85.7<br>14.3 | P-3 | 5900 | 323 |
| Exam. 25 | Polymer (A) AA12<br>Polymer (B)-(A) AM5.8 | AM2.1 | AM80<br>MB0.1 | 94.1<br>5.9 | P-4 | 5000 | 156 |
| Exam. 26 | Polymer (A) IT6<br>Polymer (B)-(A) AM31.9 | AM60<br>SM0.3 | SM1.7<br>MB0.1 | 67.7<br>32.3 | P-5 | 6250 | 534 |
| Exam. 27 | Polymer (A) IT6<br>Polymer (B)-(A) AM0.7 | AM90<br>AA2 | SM1.2<br>MB0.1 | 97.2<br>2.8 | P-6 | 5420 | 123 |
| Exam. 28 | Polymer (A) IT3<br>Polymer (B)-(A) AM14.7 | AM80<br>SM0.1 | SM2.1<br>MB0.1 | 85.1<br>14.9 | P-7 | 5250 | 362 |
| Comp. Ex.22 | AA6 | AM63 | AN31 | | Q-1 | 5200 | 20 |
| Comp. Ex.23 | AA6<br>MB0.1 | AM91.9 | SM2 | | Q-2 | 3500 | 104 |
| Comp. Ex.24 | IT3<br>SMA0.7 | AM86.3<br>MBA0.1 | AN9.9 | | Q-3 | 3700 | 51 |

AA: acrylic acid  AM: acrylamide  IT: itaconic acid
SM: sodium methallylsulfate  MB: methylene bisacrylamide  AN: acrylonitrile There will be described papermaking evaluation examples for 2 types of papermaking conditions when the polymers from Examples and 22 to 28 and Comparative Examples 22 to 24 are used as an internal paper strength agent, as well as coating evaluation examples when the polymers are used as a surface-coating paper strength agent. Unless otherwise described the amounts indicated are those on solid basis.

Internal Agent for a Kraft Paper Under Papermaking Condition 1

Papermaking Example 1

The polymer P-1 was added into a 1% N-UKP(needleleaf-unbleached sulfate pulp) slurry with a beating degree CSF (Canadian Standard Freeness) of 600 in an amount of 0.3% to the pulp. After stirring for 1 min, aluminum sulfate was added in an amount of 2.5% to the pulp, and the mixture was stirred for further 1 min. The pH of the slurry was 4.5. with stirring, cationized starch was added in an amount of 0.4% to the pulp and the mixture was stirred for 1 min. Then, acidic rosin emulsion size agent was added in an amount of 0.2% to the pulp and the mixture was stirred for further 1 min. Then, the resulting pulp slurry was used to make a paper with a TAPPI standard (square) sheet machine. The wet sheet thus made was dried in a drum dryer at 110° C. for 3 min, to give a hand-made paper with a basis weight of 70 g/m². The dried paper was subject to humidity control in an air-conditioned chamber at 20° C. and RH 65% for at least 24 hours, and its burst index(JIS-P8112), breaking length (JIS-P8113) and Steckigt sizing degree were determined. The results are shown in Table 14 as Papermaking Example 1.

TABLE 14

Papermaking condition 1 for a kraft paper

| | Polymer No. | Burst index | Breaking length (km) | Sizing degree (second) |
|---|---|---|---|---|
| Papermaking Example 1 | P-1 | 4.02 | 5.03 | 80.6 |
| Papermaking Example 2 | P-2 | 4.28 | 5.27 | 83.7 |
| Papermaking Example 3 | P-3 | 4.26 | 5.17 | 81.9 |
| Papermaking Example 4 | P-4 | 4.21 | 5.31 | 87.7 |
| Papermaking Example 5 | P-5 | 4.15 | 5.16 | 84.1 |
| Papermaking Example 6 | P-6 | 4.17 | 5.17 | 86.5 |
| Papermaking Example 7 | P-7 | 4.22 | 5.19 | 81.6 |
| Comparative Papermaking Example 1 | Q-1 | 3.85 | 4.68 | 78.2 |
| Comparative Papermaking Example 2 | Q-2 | 3.77 | 4.66 | 77.6 |
| Comparative Papermaking Example 3 | Q-3 | 3.73 | 4.58 | 74.3 |
| Comparative Papermaking Example 4 | Blank 1 | 2.88 | 3.78 | 36.8 |

Papermaking Examples 2 to 7 and Comparative Papermaking Examples 1 to 3

A paper was made as described in Papermaking Example 1 except that the polymer P-1 was replaced with each of the polymers P-2 to P-7 and Q-1 to Q-3. The results are shown in Table 14 as Papermaking Examples 2 to 7 and Comparative Papermaking Examples 1 to 3.

Comparative Papermaking Example 4

A paper was made as described in Papermaking Example 1 except that a polymer was not used. The product's physical properties were evaluated. The results are shown in Table 14 as Blank 1.

Papermaking Example 8

Aluminum sulfate was added into a 1% pulp slurry obtained from waste corrugated paper with a beating degree CSF(Canadian Standard Freeness) of 350 in an amount of 2.5% to the pulp. After stirring for 1 min, a 6:4 mixture of the polymer P-1 and Mannich modified PAM was added in an amount of 0.4% to the pulp, and the mixture was stirred for further 1 min. The pH of the slurry was 6. The CSF(JIS-P8121) of the pulp slurry was determined and it was used to make a paper with a TAPPI standard (square) sheet machine. The wet sheet thus made was dried in a drum dryer at 110° C. for 3 min, to give a hand-made paper with a basis weight of 140 g/m².

Furthermore, aluminum sulfate was added in an amount of 1.25% to the pulp and a hand-made paper sheet was prepared as described above using a pulp slurry, pH 7. The dried paper thus obtained was subject to humidity control in an air-conditioned chamber at 20° C. and RH 65% for at least 24 hours, and its burst index(JIS-P8112) and Z-axis directional strength(Internal Bond Tester; Kumagaya Riki Kogyo) were determined. The results are shown in Table 15 as Papermaking Example 8.

TABLE 15

Papermaking condition 2 for a liner

| | Polymer No. | CSF (ml) pH6 | CSF (ml) pH7 | Burst index pH6 | Burst index pH7 | Z-directional strength (mJ) pH6 | Z-directional strength (mJ) pH7 |
|---|---|---|---|---|---|---|---|
| Papermaking Example 8 | P-1 | 448 | 425 | 2.75 | 2.84 | 261 | 247 |
| Papermaking Example 9 | P-2 | 487 | 473 | 2.82 | 2.99 | 284 | 273 |
| Papermaking Example 10 | P-3 | 490 | 470 | 2.89 | 3.13 | 278 | 275 |
| Papermaking Example 11 | P-4 | 488 | 466 | 2.85 | 3.06 | 286 | 272 |
| Papermaking Example 12 | P-5 | 457 | 448 | 2.92 | 3.05 | 281 | 280 |
| Papermaking Example 13 | P-6 | 464 | 451 | 2.96 | 2.99 | 288 | 278 |
| Papermaking Example 14 | P-7 | 467 | 442 | 2.86 | 3.08 | 291 | 266 |
| Comparative Papermaking Example 5 | Q-1 | 419 | 381 | 2.38 | 2.67 | 233 | 225 |
| Comparative Papermaking Example 6 | Q-2 | 439 | 405 | 2.49 | 2.76 | 243 | 236 |
| Comparative Papermaking Example 7 | Q-3 | 405 | 378 | 2.51 | 2.78 | 245 | 230 |
| Comparative Papermaking Example 8 | Blank 2 | 344 | 332 | 1.97 | 2.01 | 191 | 185 |

Papermaking Examples 9 to 14 and Comparative Papermaking Examples 5 to 7

A paper was made as described in Papermaking Example 8 except that the polymer P-1 was replaced with each of the polymers P-2 to P-7 and Q-1 to Q-3. The results are shown in Table 15 as Papermaking Examples 9 to 14 and Comparative Papermaking Examples 5 to 7.

Comparative Papermaking Example 8

A paper was made as described in Papermaking Example 8 except that a polymer was not used. The product's physical properties were evaluated. The results are shown in Table 15 as Blank 2.

Coating Example 1

A fine coated base paper with a basis weight of 70 g/m² was cut into a size of 24 cm long and 19 cm wide. The polymer P-1 was diluted with water to 4%, and the coated base paper cut as above was soaked in the diluted solution for a second. The paper was then squeezed with two rollers and the adhered polymer was weighed. Immediately after weighing, the paper was dried in a drum dryer at 110° C. for 2 min, to give a paper sample. The coating amount was 2 g/m² on nonvolatile component basis. The dried paper thus obtained was subject to humidity control in an air-conditioned chamber at 20° C. and RH 65% for at least 24 hours, and its RI pick(RI-3 type, Akira Seisakusho; Inktuck 25, Toyo Ink; the amount of ink: 0.4 ml; 100 revolutions per minute) and Z-axis directional strength(Internal Bond Tester; Kumagaya Riki Kogyo) were determined. The results are shown in Table 16 as Coating Example 1.

TABLE 16

Coating

| | Polymer No. | RI pick | Z-directional strength (mJ) |
|---|---|---|---|
| Coating Example 1 | P-1 | 7.5 | 342 |
| Coating Example 2 | P-2 | 7.8 | 367 |
| Coating Example 3 | P-3 | 7.5 | 353 |
| Coating Example 4 | P-4 | 8.0 | 388 |
| Coating Example 5 | P-5 | 8.0 | 414 |
| Coating Example 6 | P-6 | 8.5 | 426 |
| Coating Example 7 | P-7 | 8.3 | 412 |
| Comparative Coating Example 1 | Q-1 | 7.3 | 315 |
| Comparative Coating Example 2 | Q-2 | 7.5 | 330 |
| Comparative Coating Example 3 | Q-3 | 7.3 | 310 |
| Comparative Coating Example 4 | Blank 3 | 3.0 | 117 |

Papermaking Examples 2 to 7 and Comparative Papermaking Examples 1 to 3

Coating was conducted as described in Coating Example 1 except that the polymer P-1 was replaced with each of the polymers P-2 to P-7 and Q-1 to Q-3. The results are shown in Table 16 as Coating Examples 2 to 7 and Comparative Coating Examples 1 to 3.

Comparative Coating Example 4

Coating was conducted as described in Coating Example 1 except that the diluted solution of the polymer was replaced with water. The product's physical properties were evaluated. The results are shown in Table 16 as Blank 3.

Evaluation Results

The effects of this invention will be described based on Papermaking Examples and Coating Examples. Using an acrylamide polymer improves a paper strength, compared with Blanks. However, it can be clearly seen that an anionic acrylamide polymer according to this invention in any Papermaking or Coating Example is better than a polymer obtained in any Comparative Example.

For example, when used as a paper strength agent for a kraft paper in Table 14, the polymer of this invention provides a higher paper strength and is also highly effective for size expression. Furthermore, when added as a mixture with a Mannich modified polyacrylamide as a linerboard, it exhibits excellent freeness and paper strength as shown in Table 15. In particular, it is quite effective even in a system where an amount of aluminum sulfate is smaller and a papermaking pH is higher. Furthermore, it is indicated in Table 16 that when used as a surface coating, an anionic acrylamide polymer according to this invention can significantly improve a surface paper strength as well as an internal paper strength.

Comparing the polymer P-1 from Example 1 and the polymer Q-2 from Comparative Example 2, their compositions are not very different and P-1 has a somewhat smaller molecular weight than Q-2. P-1, however, has a higher paper strength. It may be, therefore, said that the anionic acrylamide polymer of this invention exhibits an excellent paper strength due to not only its composition and molecular weight but also the fact that its molecular disposition can be well controlled by using a characteristic polymerization procedure where a polymer (B) is formed by polymerization in the presence of a polymer (A).

As described above, it can be understood that the anionic acrylamide polymer of this invention is highly effective as an internal paper strength agent or a surface coating, compared with an agent according to the prior art.

Preparation Example 1

In a five-necked flask equipped with an agitator, a reflux condenser, a thermometer, a nitrogen-inlet tube and a dropping inlet (hereinafter, referred to as a "reaction vessel") was placed 181.93 g of purified water, and then the internal temperature was adjusted to 80° C. while introducing nitrogen gas.

A solution of 58.58 g of 50% acrylamide and 0.26 g of sodium methallylsulfonate and a solution of 0.03 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour(This procedure is referred to as the first step).

A solution of 516.44 g of 50% acrylamide, 11.08 g of sodium methallylsulfonate and 0.64 g of methylene bisacrylamide and a solution of 0.20 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component, i.e., the product concentration, with a Brookfield viscosity of 4,200 mPa·s at 25° C.(This procedure is referred to as the second step). The weight-average molecular weight of this polymer by GPC-MALLS was 1,630,000. The polymer is designated as A-1.

Preparation Example 2

In the above reaction vessel was placed 202.25 g of purified water, and then the internal temperature was adjusted to 80° C. while introducing nitrogen gas.

A solution of 58.47 g of 50% acrylamide and 2.60 g of sodium methallylsulfonate and a solution of 0.03 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour.

A solution of 514.51 g of 50% acrylamide, 9.76 g of sodium methallylsulfonate and 0.63 g of methylene bisacrylamide and a solution of 0.2 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component with a Brookfield viscosity of 3,700 mPa·s at 25° C. The weight-average molecular weight of this polymer by GPC-MALLS was 1,870,000. The polymer is designated as A-2.

Preparation Example 3

In the above reaction vessel was placed 302.80 g of purified water, and then the internal temperature was adjusted to 80° C. while introducing nitrogen gas.

A solution of 146.50 g of 50% acrylamide and 1.64 g of sodium methallylsulfonate and a solution of 0.08 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour.

A solution of 439.52 g of 50% acrylamide and 5.60 g of sodium methallylsulfonate and a solution of 0.19 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component with a Brookfield viscosity of 6,900 mPa·s at 25° C. The weight-average molecular weight of this polymer by GPC-MALLS was 1,050,000. The polymer is designated as A-3.

Preparation Example 4

In the above reaction vessel was placed 417.06 g of purified water, and then the internal temperature was adjusted to 80° C. while introducing nitrogen gas.

A solution of 305.08 g of 50% acrylamide and 3.40 g of sodium methallylsulfonate and a solution of 0.16 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour.

A solution of 457.62 g of 50% acrylamide, 6.84 g of sodium methallylsulfonate and 0.83 g of methylene bisacrylamide and a solution of 0.18 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component with a Brookfield viscosity of 7,800 mPa·s at 25° C. The weight-average molecular weight of this polymer by GPC-MALLS was 1,730,000. The polymer is designated as A-4.

Preparation Example 5

In the above reaction vessel was placed 314.80 g of purified water, and then the internal temperature was adjusted to 80° C. while introducing nitrogen gas.

A solution of 305.18 g of 50% acrylamide and 3.39 g of sodium methallylsulfonate and a solution of 0.16 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour.

A solution of 305.18 g of 50% acrylamide and 4.80 g of sodium methallylsulfonate and a solution of 0.12 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component with a Brookfield viscosity of 7,300 mPa·s at 25° C. The weight-average molecular weight of this polymer by GPC-MALLS was 1,070,000. The polymer is designated as A-5.

Preparation Example 6

In the above reaction vessel was placed 314.80 g of purified water, and then the internal temperature was adjusted to 80° C. while introducing nitrogen gas.

A solution of 305.18 g of 50% acrylamide and 3.39 g of sodium methallylsulfonate and a solution of 0.16 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour.

A solution of 305.18 g of 50% acrylamide, 4.80 g of sodium methallylsulfonate and 0.67 g of methylene bisacrylamide and a solution of 0.12 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component with a Brookfield viscosity of 6,900 mPa·s at 25° C. The weight-average molecular weight of this polymer by GPC-MALLS was 1,670,000. The polymer is designated as A-6.

Preparation Example 7

In the above reaction vessel was placed 246.00 g of purified water, and then the internal temperature was adjusted to 80° C. while introducing nitrogen gas.

A solution of 305.16 g of 50% acrylamide and 3.39 g of sodium methallylsulfonate and a solution of 0.16 g of 4,4'-azobis-4-cyanovaleric acid(purity: 84%) in 51.20 g of purified water were prepared, and simultaneously added dropwise at constant rates into the reaction vessel over 30 min, maintaining the internal temperature at 80° C. After addition, polymerization was continued at 80° C. for 1 hour.

A solution of 203.42 g of 50% acrylamide, 4.00 g of sodium methallylsulfonate and 0.56 g of methylene bisacrylamide and a solution of 0.08 g of 4,4'-azobis-4-cyanovaleric acid(purity: 84%) in 51.20 g of purified water were prepared and simultaneously added dropwise at constant rates into the reaction vessel over 2 hours, maintaining the internal temperature at 80° C. After addition, polymerization was continued at 80° C. for 2 hours, to provide a polymer containing 30% of the nonvolatile component with a Brookfield viscosity of 6,400 mPa·s at 25° C. The weight-average molecular weight of this polymer by GPC-MALLS was 1,560,000. The polymer is designated as A-7.

Preparation Example 8

In the above reaction vessel was placed 302.80 g of purified water, and then the internal temperature was adjusted to 80° C. while introducing nitrogen gas.

A solution of 439.52 g of 50% acrylamide and 4.94 g of sodium methallylsulfonate and a solution of 0.19 g of 4,4'-azobis-4-cyanovaleric acid(purity: 84%) in 51.20 g of purified water were prepared, and simultaneously added dropwise at constant rates into the reaction vessel over 2 hours, maintaining the internal temperature at 80° C. After addition, polymerization was continued at 80° C. for 1 hour.

A solution of 146.50 g of 50% acrylamide and 2.30 g of sodium methallylsulfonate and a solution of 0.08 g of 4,4'-azobis-4-cyanovaleric acid(purity: 84%) in 51.20 g of purified water were prepared and simultaneously added dropwise at constant rates into the reaction vessel over 30 min, maintaining the internal temperature at 80° C. After addition, polymerization was continued at 80° C. for 2 hours, to provide a polymer containing 30% of the nonvolatile component with a Brookfield viscosity of 7,200 mPa·s at 25° C. The weight-average molecular weight of this polymer by GPC-MALLS was 1,040,000. The polymer is designated as A-8.

Preparation Example 9

In the above reaction vessel was placed 314.80 g of purified water, and then the internal temperature was adjusted to 80° C. while introducing nitrogen gas.

A solution of 601.34 g of 50% acrylamide and 7.12 g of sodium methallylsulfonate and a solution of 0.32 g of 4,4'-azobis-4-cyanovaleric acid(purity: 84%) in 51.20 g of purified water were prepared, and simultaneously added dropwise at constant rates into the reaction vessel over 2 hours, maintaining the internal temperature at 80° C. After addition, polymerization was continued at 80° C. for 1 hour.

A solution of 31.6 g of 50% acrylamide, 0.36 g of sodium methallylsulfonate and 0.07 g of methylene bisacrylamide and a solution of 0.04 g of 4,4'-azobis-4-cyanovaleric acid (purity: 84%) in 51.20 g of purified water were prepared and simultaneously added dropwise at constant rates into the reaction vessel over 30 min, maintaining the internal temperature at 80° C. After addition, polymerization was continued at 80° C. for 2 hours, to provide a polymer containing 30% of the nonvolatile component with a Brookfield viscosity of 7,200 mPa·s at 25° C. The weight-average molecular weight of this polymer by GPC-MALLS was 1,500,000. The polymer is designated as A-9.

Preparation Example 10

In the above reaction vessel was placed 377.76 g of purified water, and then the internal temperature was adjusted to 80° C. while introducing nitrogen gas.

A solution of 466.52 g of 50% acrylamide and 3.85 g of sodium methallylsulfonate and a solution of 0.25 g of 4,4'-azobis-4-cyanovaleric acid(purity: 84%) in 51.20 g of purified water were prepared, and simultaneously added dropwise at constant rates into the reaction vessel over 2 hours, maintaining the internal temperature at 80° C. After addition, polymerization was continued at 80° C. for 1 hour.

A solution of 24.44 g of 50% acrylamide, 0.27 g of sodium methallylsulfonate and 0.05 g of methylene bisacrylamide and a solution of 0.04 g of 4,4'-azobis-4-cyanovaleric acid(purity: 84%) in 51.20 g of purified water were prepared and simultaneously added dropwise at constant rates into the reaction vessel over 30 min, maintaining the internal temperature at 80° C. After addition, polymerization was continued at 80°C. for 2 hours, to provide a polymer containing 25% of the nonvolatile component with a Brookfield viscosity of 4,300 mPa·s at 25° C. The weight-average molecular weight of this polymer by GPC-MALLS was 1,360,000. The polymer is designated as A-10.

Preparation Example 11

In the above reaction vessel was placed 236.50 g of purified water, and then the internal temperature was adjusted to 80° C. while introducing nitrogen gas.

A solution of 600.00 g of 50% acrylamide, 3.46 g of sodium persulfate and 0.86 g of ammonium ferrous sulfate in 51.20 g of purified water was prepared and added dropwise at a constant rate into the reaction vessel over 2 hours, maintaining the internal temperature at 80° C. After addition, polymerization was continued at 80° C. for 1 hour, to provide a polymer containing 30% of the nonvolatile component with a Brookfield viscosity of 7,400 mPa·s at 25° C. The weight-average molecular weight of this polymer by GPC-MALLS was 150,000. The polymer is designated as B-1.

Preparation Example 12

In the above reaction vessel was placed 236.50 g of purified water, and then the internal temperature was adjusted to 80° C. while introducing nitrogen gas.

A solution of 600.00 g of 50% acrylamide and 4.34 g of sodium methallylsulfonate and a solution of 0.15 g of 4,4'-azobis-4-cyanovaleric acid(purity: 84%) in 50.00 g of purified water were prepared and simultaneously added dropwise at constant rates into the reaction vessel over 2 hours, maintaining the internal temperature at 80° C. After addition, polymerization was continued at 80° C. for 3 hours, to provide a polymer containing 30% of the nonvolatile component with a Brookfield viscosity of 5,800 mPa·s at 25° C. The weight-average molecular weight of this polymer by GPC-MALLS was 580,000. The polymer is designated as B-2.

Preparation Example 13

In the above reaction vessel was placed 236.50 g of purified water, and then the internal temperature was adjusted to 80° C. while introducing nitrogen gas.

A solution of 600.00 g of 50% acrylamide, 9.34 g of sodium methallylsulfonate and 0.33 g of methylene bisacrylamide and a solution of 0.30 g of 4,4'-azobis-4-cyanovaleric acid(purity: 84%) in 50.00 g of purified water were prepared and simultaneously added dropwise at constant rates into the reaction vessel over 2 hours, maintaining the internal temperature at 80° C. After addition, polymerization was continued at 80° C. for 3 hours, to provide a polymer containing 30% of the nonvolatile component with a Brookfield viscosity of 6,100 mPa·s at 25° C. The weight-average molecular weight of this polymer by GPC-MALLS was 1,540,000. The polymer is designated as B-3.

Preparation Example 14

In the above reaction vessel was placed 236.50 g of purified water, and then the internal temperature was adjusted to 80° C. while introducing nitrogen gas.

A solution of 600.00 g of 50% acrylamide, 18.00 g of sodium methallylsulfonate and 0.66 g of methylene bisacrylamide and a solution of 0.30 g of 4,4'-azobis-4-cyanovaleric acid(purity: 84%) in 50.00 g of purified water were prepared and simultaneously added dropwise at constant rates into the reaction vessel over 2 hours, maintaining the internal temperature at 80° C. After addition, polymerization was continued at 80° C. for 3 hours, to provide a polymer containing 30% of the nonvolatile component with a Brookfield viscosity of 7,600 mPa·s at 25° C. The weight-average molecular weight of this polymer by GPC-MALLS was 1,690,000. The polymer is designated as B-4.

Preparation Example 15

In the above reaction vessel were placed 298.50 g of 50% acrylamide and 687.60 g of purified water, and while replacing the atmosphere with nitrogen the mixture was warmed to 45° C. Then, 7.20 g of 10% sodium persulfate and 1.80 g of 10% ammonium ferrous sulfate were added to the mixture, immediately after which polymerization was initiated and the solution temperature was raised to 80° C. Polymerization was then continued at 80° C. for 2 hours, to provide a polymer containing 15.0% of the nonvolatile component with a Brookfield viscosity of 8,100 mPa·s at 25° C. The weight-average molecular weight of this polymer by GPC-MALLS was 600,000. The polymer is designated as B-5.

The compositions and the physical properties of the polymers from Preparation Examples 1 to 15 are shown in Table 17.

TABLE 17

|  |  | Comp. (mol %) | | | Product concentration | Viscosity | Molecular weight | Polymer |
|---|---|---|---|---|---|---|---|---|
|  |  | AAM | MBA | SMS | (%) | (mPa · s) | ($10^4$) | No. |
| Preparation | 1st Step | 10.0 |  | 0.04 | 30.0 | 4,200 | 163 | A-1 |
| Example 1 | 2nd Step | 88.2 | 0.10 | 1.70 |  |  |  |  |
| Preparation | 1st Step | 10.0 |  | 0.04 | 30.0 | 3,700 | 187 | A-2 |
| Example 2 | 2nd Step | 88.0 | 0.10 | 1.50 |  |  |  |  |
| Preparation | 1st Step | 24.8 |  | 0.25 | 30.0 | 6,900 | 105 | A-3 |
| Example 3 | 2nd Step | 74.2 |  | 0.85 |  |  |  |  |

TABLE 17-continued

|  |  | Comp. (mol %) | | | Product concentration (%) | Viscosity (mPa · s) | Molecular weight (10⁴) | Polymer No. |
|---|---|---|---|---|---|---|---|---|
|  |  | AAM | MBA | SMS |  |  |  |  |
| Preparation Example 4 | 1st Step | 39.6 |  | 0.40 | 30.0 | 7,800 | 173 | A-4 |
|  | 2nd Step | 59.1 | 0.10 | 0.80 |  |  |  |  |
| Preparation Example 5 | 1st Step | 49.5 |  | 0.50 | 30.0 | 7,300 | 107 | A-5 |
|  | 2nd Step | 49.3 |  | 0.70 |  |  |  |  |
| Preparation Example 6 | 1st Step | 49.5 |  | 0.50 | 30.0 | 6,900 | 167 | A-6 |
|  | 2nd Step | 49.2 | 0.10 | 0.70 |  |  |  |  |
| Preparation Example 7 | 1st Step | 59.4 |  | 0.59 | 30.0 | 6,400 | 156 | A-7 |
|  | 2nd Step | 39.2 | 0.10 | 0.70 |  |  |  |  |
| Preparation Example 8 | 1st Step | 74.3 |  | 0.75 | 30.0 | 7,200 | 104 | A-8 |
|  | 2nd Step | 24.7 |  | 0.35 |  |  |  |  |
| Preparation Example 9 | 1st Step | 94.0 |  | 1.00 | 30.0 | 7,200 | 150 | A-9 |
|  | 2nd Step | 4.9 | 0.01 | 0.05 |  |  |  |  |
| Preparation Example 10 | 1st Step | 94.3 |  | 0.70 | 25.0 | 4,300 | 136 | A-10 |
|  | 2nd Step | 4.9 | 0.01 | 0.05 |  |  |  |  |
| Preparation Example 11 |  | 100.0 |  |  | 30.0 | 7,400 | 15 | B-1 |
| Preparation Example 12 |  | 99.4 |  | 0.65 | 30.0 | 5,800 | 58 | B-2 |
| Preparation Example 13 |  | 98.6 | 0.05 | 1.38 | 30.0 | 6,100 | 154 | B-3 |
| Preparation Example 14 |  | 98.3 | 0.10 | 1.62 | 30.0 | 7,600 | 169 | B-4 |
| Preparation Example 15 |  | 100.0 |  |  | 15.0 | 8,100 | 60 | B-5 |

AAM: acrylamide; MBA: methylene bisacrylamide; SMS: sodium methallylsulfonate

Hofmann degradation of the polymers from Preparation Examples will be described, using the polymer A-1 as a typical example.

First, 2.0 g of the polymer A-1 from Preparation Example 1 as a solid was diluted with purified water, to give a solution of 40.0 g in total. The solution was heated to 70° C., to which with stirring was added a solution(8.10 g) of 12.5% of sodium hypochlorite and 20% sodium hydroxide(molar ratio=1:2), and the mixture was allowed to stand for 30 seconds. Then, 152.60 g of pre-cooled purified water was added, and the resulting mixture was cooled in ice-water to give a Hofmann degradation product(Example 29).

A similar procedure was conducted for each of the polymers A-2 to A-10(Examples 30 to 38) and B-1 to B-5 (Comparative Examples 25 to 29), to give a Hofmann degradation product. Each reaction product thus obtained was colloidal-titrated in a 1/400N aqueous solution of potassium polyvinylsulfonate using toluidine blue as an indicator to determine its cation valence, which is shown in Table 18.

TABLE 18

|  | Polymer material No. | Cationic charge density (meq/g) | C.S.F (ml) | Burst index (kPa · m2/g) | Z-directional strength (kg · cm) |
|---|---|---|---|---|---|
| Example 29 | A-1 | 3.65 | 545 | 2.97 | 2.76 |
| Example 30 | A-2 | 3.64 | 563 | 2.97 | 2.84 |
| Example 31 | A-3 | 3.67 | 522 | 2.94 | 2.73 |
| Example 32 | A-4 | 3.71 | 545 | 2.83 | 2.64 |
| Example 33 | A-5 | 3.70 | 513 | 2.85 | 2.65 |
| Example 34 | A-6 | 3.67 | 527 | 2.85 | 2.62 |
| Example 35 | A-7 | 3.71 | 563 | 2.90 | 2.65 |
| Example 36 | A-8 | 3.73 | 536 | 2.88 | 2.62 |
| Example 37 | A-9 | 3.78 | 549 | 2.88 | 2.68 |
| Example 38 | A-10 | 3.76 | 554 | 2.90 | 2.74 |
| Comparative Example 25 | B-1 | 3.89 | 482 | 2.45 | 2.33 |
| Comparative Example 26 | B-2 | 3.63 | 500 | 2.74 | 2.57 |
| Comparative Example 27 | B-3 | 3.38 | 486 | 2.52 | 2.53 |
| Comparative Example 28 | B-4 | 3.41 | 491 | 2.68 | 2.54 |
| Comparative Example 29 | B-5 | 3.64 | 509 | 2.45 | 2.48 |
| Blank |  |  | 450 | 2.23 | 1.55 |

Evaluation results of the Hofmann degradation products as an internal paper strength agent will be described.

Waste corrugated papers were beaten to give a 2.0% pulp slurry with a Canadian Standard Freeness(hereinafter, referred to as C.S.F.) of 450 mL, whose pH was then adjusted to 5.5. To the mixture was added aluminum sulfate in an amount of 1.8% to the pulp, and the mixture was stirred for 1 min. Then, a 1:1 mixture of a commercially available anionic polyacrylamide(Hopelon 3150B; Mitsui Chemical) and a Hofmann degradation product was added in an amount of 0.5% to the pulp, and the mixture was stirred for 1 min. A part of the pulp slurry was used to determine a C.S.F. according to JIS P8121, and the remainder was subject to papermaking with a TAPPI standard (square) sheet machine. The wet sheet thus made was dried in a dryer at 110° C. for 1 hour, to give a hand-made paper with a basis weight of 150 g/m². The dried paper was subject to humidity control in an air-conditioned chamber at 20° C. and RH 65% for at least 24 hours, and its burst index(JIS-P8112) and Z-axis directional strength(Internal Bond Tester; Kumagaya Riki Kogyo) were determined.

The results are shown in Table 18, where a blank indicates that aluminum sulfate or a paper strength agent was not added.

As seen from the table, the cationic polymers according to this invention prepared by Hofmann degradation exhibit excellent effects on a freeness, a burst strength and a Z-axis directional strength. Furthermore, the high-concentration polymers according to this invention can improve not only paper strength but also freeness. The cation polymers are very useful as a paper strength agent or drainage aid.

What is claimed is:

1. A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

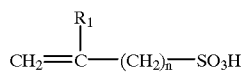

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein at least one of vinyl monomers (b) is an ionic monomer and at least one of the vinyl monomers (b) is (meth)acrylamide.

2. A polymer (B) as claimed in claim 1, wherein the weight average molecular weight of the polymer (A) is 1,000 to 5,000,000.

3. A polymer (B) as claimed in claim 1, wherein at least one of the vinyl monomers (c) is (meth)acrylamide.

4. A polymer (B) as claimed in claim 1, wherein the polymer (A) consists of the same vinyl monomer components as those of the polymer (B), and at least one vinyl monomer component has a molar ratio in the polymer (A) substantially different from that in the polymer (B).

5. A polymer (B) as claimed in claim 1, wherein the remaining vinyl monomer composition after subtracting the vinyl monomer composition of the polymer (A) from that of the polymer (B), is different from the composition of the polymer (A).

6. A polymer (B) as claimed in claim 1, wherein the components or the composition are substantially different between the polymers (A) and (B).

7. A polymer (B) as claimed in claim 1, wherein at least one of vinyl monomers (b) is an anionic monomer.

8. A polymer (B) as claimed in claim 1 having a weight average molecular weight of 100,000 to 10,000,000.

9. A polymer (B) as claimed in claim 1 comprising a cross-linking vinyl monomer as a component monomer.

10. A paper strength agent comprising the polymer (B) as claimed in claim 1.

11. A surface coating comprising the polymer (B) as claimed in claim 1.

12. A cationic polymer (C) prepared by Hofmann degradation at an alkaline pH of a polymer (B) that is prepared by polymerizing one or more vinyl monomers (c) in the presence of a polymer (A) prepared by polymerizing one or more vinyl monomers (a) selected from the group consisting of vinyl monomers represented by the general formula (1):

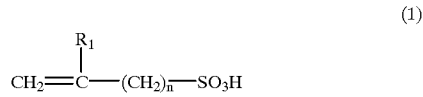

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein one or both of vinyl monomers (b) and (c) comprise a monomer having an amide group.

13. A cationic polymer (C) as claimed in claim 12 wherein the monomer having an amide group is (meth)acrylamide.

14. A cationic polymer (C) as claimed in claim 12 wherein the polymer (B) contains 0.1 to 99.9 mol % of the monomers of the polymer (A).

15. A cationic polymer (C) as claimed in claim 12 wherein the weight average molecular weight of the polymer (B) is 100,000 to 10,000,000.

16. A cationic polymer (C) as claimed in claim 12 wherein the said Hofmann degradation is reaction of the polymer (B) with a hypohalous acid salt at an alkaline pH at a temperature of 50 to 110° C.

17. A paper strength agent comprising the cationic polymer (C) as claimed in claim 12.

18. A drainage aid comprising the cationic polymer (C) as claimed in claim 12.

19. A process for manufacturing a cationic polymer (C), comprising the steps of
preparing a polymer (A) by polymerizing one or more vinyl monomers (a) selected from the group consisting of vinyl monomers represented by the general formula (1):

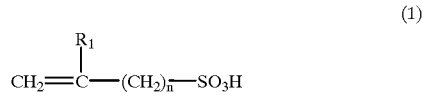

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a);
polymerizing one or more vinyl monomers (c) in the presence of the polymer (A) to prepare a polymer (B); and
conducting Hofmann degradation of the polymer (B) at an alkaline pH;
and wherein one or both of the vinyl monomers (b) and (c) comprise a monomer having an amide group.

20. A cationic polymer as claimed in claim 12 wherein at least one of the vinyl monomers (b) is (meth)acrylamide.

21. A cationic polymer as claimed in claim 12 wherein at least one of the vinyl monomers (c) is (meth)acrylamide.

22. A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

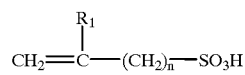

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein at least one of vinyl monomers (b) is an anionic monomer and the anionic monomer content of the polymer (B) is 1 to 30 mol %.

23. A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

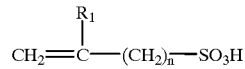

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein at least one of vinyl monomers (b) is an ionic monomer wherein the polymer (A) consists of the same vinyl monomer components as those of the polymer (B), and at least one vinyl monomer component has a molar ratio in the polymer (A) substantially different from that in the polymer (B).

24. A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

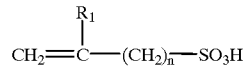

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein at least one of vinyl monomers (b) is an ionic monomer, said polymer (B) further comprising a cross-linking vinyl monomer as a component monomer.

25. A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

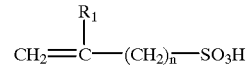

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein the one or more vinyl monomers (c) are bonded to a unit derived from the one or more vinyl monomers (a).

26. The polymer (B) as claimed in claim 25 wherein at least one of the vinyl monomers (b) is an ionic monomer.

27. A paper strength agent comprising the polymer (B) as claimed in claim 25.

28. A surface coating comprising the polymer (B) as claimed in claim 25.

29. A polymer (B) prepared by polymerizing one or more vinyl monomers (c) in the presence of a polymer (A) prepared by polymerizing one or more vinyl monomers (a) selected from the group consisting of vinyl monomers represented by the general formula (1):

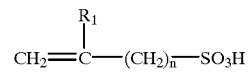

(1)

wherein $R_1$ represents a hydrogen atom or a lower alkyl with 1 to 3 carbon atoms and n is an integer of 1 to 8 and their salts with one or more vinyl monomers (b) which are co-polymerizable with the vinyl monomer components (a) wherein at least one of vinyl monomers (b) is an ionic monomer and the molar ratio of all the ionic monomers to all the monomers for the polymer (B) is 0.01 to 0.30.

30. A paper strength agent comprising the polymer (B) as claimed in claim 22.

31. A paper strength agent comprising the polymer (B) as claimed in claim 23.

32. A paper strength agent comprising the polymer (B) as claimed in claim 24.

33. A paper strength agent comprising the polymer (B) as claimed in claim 29.

34. A surface coating comprising the polymer (B) as claimed in claim 22.

35. A surface coating comprising the polymer (B) as claimed in claim 23.

36. A surface coating comprising the polymer (B) as claimed in claim 24.

37. A surface coating comprising the polymer (B) as claimed in claim 29.

* * * * *